(12) United States Patent
Jeong

(10) Patent No.: US 12,246,578 B2
(45) Date of Patent: Mar. 11, 2025

(54) THERMAL MANAGEMENT SYSTEM FOR VEHICLE

(71) Applicants: Hyundai Motor Company, Seoul (KR); Kia Corporation, Seoul (KR)

(72) Inventor: Seong Bin Jeong, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 128 days.

(21) Appl. No.: 17/517,470

(22) Filed: Nov. 2, 2021

(65) Prior Publication Data
US 2022/0355645 A1 Nov. 10, 2022

(30) Foreign Application Priority Data
May 10, 2021 (KR) .................. 10-2021-0059700

(51) Int. Cl.
*B60H 1/00* (2006.01)
*B60K 11/04* (2006.01)
*B60K 11/08* (2006.01)

(52) U.S. Cl.
CPC ..... *B60H 1/00885* (2013.01); *B60H 1/00664* (2013.01); *B60H 1/00807* (2013.01); *B60K 11/04* (2013.01); *B60K 11/085* (2013.01); *B60H 2001/00307* (2013.01); *B60H 2001/00928* (2013.01)

(58) Field of Classification Search
CPC ............ B60H 1/00885; B60H 1/00664; B60H 1/00807; B60H 2001/00307; B60H 2001/00928; B60H 1/00278; B60H 1/00921; B60H 1/2225; B60H 1/143; B60H 1/323; B60K 11/04; B60K 11/085; B60K 17/34; B60K 2001/003; B60K 11/02; B60Y 2400/302; B60Y 2400/303; Y02T 10/70; F01P 7/165; F01P 3/12; F01P 2005/105; F01P 2007/146; F01P 2025/08
See application file for complete search history.

(56) References Cited

U.S. PATENT DOCUMENTS

2016/0033214 A1* 2/2016 Kim .................. B60K 11/085
165/287
2016/0318370 A1* 11/2016 Rawlinson ......... B60H 1/32281
(Continued)

*Primary Examiner* — Nelson J Nieves
*Assistant Examiner* — Matthew John Moscola
(74) *Attorney, Agent, or Firm* — Morgan, Lewis & Bockius LLP

(57) ABSTRACT

A thermal management system may include a first cooling circuit cooling PE parts and including a first radiator, a first coolant line circulating a coolant between the first radiator and the PE parts, and a first electric water pump circulating the coolant along the first coolant line, a heat pump system including a compressor compressing a refrigerant, an internal condenser performing a heat exchange between the compressed refrigerant and air supplied inside a vehicle, a refrigerant line circulating the refrigerant between the compressor and the internal condenser, and a heat exchanger for the heat exchange between the coolant and the refrigerant, a flow increase bypass line between the first coolant lines on the entrance and exit sides of the PE parts, and a coolant control valve provided at location where the flow increase bypass line is branched in the first coolant line and controlling a flow direction of the coolant.

17 Claims, 11 Drawing Sheets

(56) References Cited

U.S. PATENT DOCUMENTS

| | | | | |
|---|---|---|---|---|
| 2016/0318410 | A1* | 11/2016 | Rawlinson | B60L 58/27 |
| 2019/0070951 | A1* | 3/2019 | Lucke | H01M 10/625 |
| 2020/0338950 | A1* | 10/2020 | Kim | B60H 1/00921 |
| 2020/0338957 | A1* | 10/2020 | Kim | F01P 7/026 |
| 2021/0031592 | A1* | 2/2021 | Kim | B60H 1/143 |
| 2021/0101444 | A1* | 4/2021 | Blatchley | B60H 1/3211 |
| 2022/0181722 | A1* | 6/2022 | Kim | B60H 1/00278 |
| 2022/0234420 | A1* | 7/2022 | Hall | F01P 7/165 |
| 2022/0274458 | A1* | 9/2022 | Eser | H01M 10/615 |
| 2022/0281351 | A1* | 9/2022 | Bartsch | B60L 58/27 |
| 2022/0314737 | A1* | 10/2022 | Hwang | B60H 1/00885 |
| 2023/0104670 | A1* | 4/2023 | Mothier | H01M 8/04037 |
| | | | | 429/437 |

\* cited by examiner

| Mode | Determination condition (AND condition) | | Notes |
|---|---|---|---|
| | First temperature sensor | Second temperature sensor | |
| First Mode | First detection temperature > outside air temperature + $\alpha$ °C (area in which temperature of PE heat source is high) | Second detection temperature ≦ outside air temperature − $\beta$ °C (area in which recovery of air heat is possible) | HTR: recovery of PE heat possible LTR: recovery of air heat possible |
| Second Mode | First detection temperature > outside air temperature + $\alpha$ °C (area in which temperature of PE heat source is high) | Second detection temperature > outside air temperature − $\beta$ °C (area in which recovery of air heat is impossible) | HTR: recovery of PE heat possible LTR: Recovery of air heat Impossible |
| Third Mode | First detection temperature ≦ outside air temperature + $\alpha$ °C (area in which temperature of PE heat source is low) | Second detection temperature ≦ outside air temperature − $\beta$ °C (area in which recovery of air heat is possible) | HTR: recovery of PE heat impossible (mode change) Recovery of air heat possible LTR: recovery of air heat possible |
| Fourth Mode | First detection temperature ≦ outside air temperature + $\alpha$ °C (area in which temperature of PE heat source is low) | Second detection temperature > outside air temperature − $\beta$ °C (area in which recovery of air heat is impossible) | Recovery of air heat impossible |

FIG. 3A

| Mode | Heat pump COP | AAF | HTR | | | | LTR | |
|---|---|---|---|---|---|---|---|---|
| | | | Operating mode | First EWP | First bypass valve | Coolant control valve | Operating mode | Second EWP |
| First Mode | 3.5 ≤ COP < 5.0 | OPEN | Recover PE heat | operating | Open bypass line | Open PE-side | Recover air heat | operating |
| Second Mode | 2.0 ≤ COP < 3.5 | CLOSE | Recover PE heat | operating | Open bypass line | Open PE-side | Not operating | Not operating |
| Third Mode | 1.0 ≤ COP < 2.0 | OPEN | Recover air heat | operating | Open radiator side | Open bypass line | Recover air heat | operating |
| Fourth Mode | COP < 1.0 | CLOSE | Not operating | Not operating | · | · | Not operating | Not operating |

FIG. 3B

THERMAL MANAGEMENT SYSTEM FOR VEHICLE

CROSS-REFERENCE TO RELATED APPLICATION

The present application claims priority to Korean Patent Application No. 10-2021-0059700 filed on May 10, 2021, the entire contents of which is incorporated herein for all purposes by this reference.

BACKGROUND OF THE INVENTION

Field of the Invention present invention relates to a thermal management system for a vehicle, and more particularly, to a thermal management system for a vehicle, which can solve a problem with performance degradation of a heat pump system caused by a reduction in the flow rate of a coolant upon low-temperature driving.

Description of Related Art

In general, an air-conditioning apparatus of heating or cooling the interior is mounted on a vehicle. In the vehicle, the air-conditioning apparatus provides a comfortable indoor environment to a passenger by always maintaining an indoor temperature within the vehicle at a proper temperature regardless of a change in an external temperature.

The air-conditioning apparatus of a vehicle includes an air-conditioning system for circulating a refrigerant. The air-conditioning system includes, as major components, a compressor for compressing and transmitting a refrigerant, a condenser for condensing the refrigerant compressed by the compressor, an expansion valve for expanding the refrigerant condensed and liquefied by the condenser, and an evaporator for evaporating the refrigerant expanded by the expansion valve and simultaneously cooling the air ventilated to the interior of the vehicle by use of evaporative latent heat of the refrigerant.

In the air-conditioning system, in the summer, in a cooling mode, a high-temperature and high-pressure vapor refrigerant compressed by the compressor is condensed through the condenser and is circulated to the compressor again via the expansion valve and the evaporator. In the instant case, the expansion valve expands the condensed liquid refrigerant into a low-temperature and low-pressure refrigerant. The evaporator cools the air through a heat exchange with the expanded refrigerant and then discharges the results to the interior of the vehicle so that indoor cooling may be performed.

Recently, as interest in energy efficiency and an environmental pollution problem is increasing, an eco-friendly vehicle configured for substantially substituting the internal combustion engine vehicle is developed. The eco-friendly vehicle may be classified into an electric vehicle (e.g., FCEV or BEV) driven using a fuel cell or a battery as a power source and a hybrid vehicle (e.g., HEV or PHEV) driven using an engine and a motor as a driving source. These eco-friendly vehicles (xEV) are electric vehicles in a broad sense, and have a common feature in a motor-driven vehicle and an electrified vehicle which drive by driving the motor by power charged in the battery.

A thermal management system for performing thermal management the entire vehicle is mounted on the electric vehicle. The thermal management system may be defined as a system in a broad sense, which includes the air-conditioning system and heating system of an air-conditioning apparatus, a cooling system for performing thermal management and cooling for a power system by use of a coolant and a refrigerant, and a heat pump system.

In the instant case, the heat pump system may be used as an assistant heating apparatus along with an electric heater (e.g., a PTC heater), that is, a main heating apparatus of the air-conditioning apparatus, and is a system configured to recover waste heat from power electronic (PE) parts, a battery, etc and use the waste heat for heating.

Furthermore, the cooling system includes components configured for managing heat of the power system by cooling or heating parts for the power system through the circulation of a coolant. A known cooling system may include a reservoir tank in which a coolant is stored, an electric water pump (EWP) for forcibly transmitting the coolant to circulate the coolant, a radiator and a cooling fan for radiating heat of the coolant, a battery chiller for cooling the battery, a battery heater for heating the battery, valves for controlling a flow of the coolant, hoses (e.g., coolant lines) coupled between these components, and a controller configured for controlling the circulation and flow of the coolant and elements of a cooling circuit to control a temperature of the coolant.

In the instant case, the battery chiller cools the coolant by use of the refrigerant of the air-conditioning system, and is a heat exchanger for delivering heat of the coolant to the refrigerant through a heat exchange between the coolant and the refrigerant in the state in which heat of the battery has been delivered to the coolant. The battery chiller is a cooler for cooling the coolant through the refrigerant so that the battery is eventually cooled by the coolant.

Furthermore, the cooling system of the electric vehicle controls temperatures of the PE parts and the battery by circulating the coolant through coolant passages of the PE parts for driving the vehicle and a coolant passage of the battery along which operating power is supplied to the PE parts. Furthermore, the cooling system may be configured to separate and individually cool the PE parts and the battery and to integrate and cool the PE parts and the battery, if necessary. To the present end, the cooling system may control a flow direction of the coolant by controlling an operation of a three-way valve, etc.

Recently, to increase a driving range of an electric vehicle and improve MPGe, a parallel type separation cooling system in which two radiators, that is, a high-temperature radiator and a low-temperature radiator, are disposed in the front portion of the vehicle and parallel coolant lines circulating the radiators are configured to separate and cool the PE parts and the battery is being developed.

The most important factor in determining a commercial value of the electric vehicle is all electric range (AER) per charge. Recently, an AER (low-temperature driving range per day) per charge at a low temperature is also spotlighted along with the AER per charge. The low-temperature driving range per day recently becomes an important factor in determining or highlighting a commercial value of the electric vehicle because a purchasing subsidy to the electric vehicle is differentially provided based on a room temperature versus low-temperature driving range ratio. In relation to providing the purchasing subsidy to the electric vehicle, a test method for the low-temperature driving range per day has been regulated.

In the electric vehicle, a primary reason why the room temperature driving range versus the low-temperature driving range is reduced is that an electric heater is driven upon low-temperature driving. By considering the primary reason, "Max Warm/Vent/Blower Max" is applied in an air-conditioning mode when the low-temperature driving range per day is evaluated.

In general, the electric vehicle utilizes a high voltage PTC heater, that is, an electric heater, a heating source because the electric vehicle does not include a heat source, such as the engine of the internal combustion vehicle. The low-temperature driving range is greatly reduced upon heating because power consumption of the PTC heater is very great.

To supplement the problem, a heat pump system, that is, an assistant heating system, is used in the electric vehicle. If the room temperature versus low-temperature driving range ratio is increased using the heat pump system, it also becomes advantageous in supporting a purchasing subsidy to the electric vehicle. Accordingly, in the electric vehicle, performance of the heat pump is very important.

The heat pump system of the electric vehicle recovers heat of PE parts, such as a motor, an inverter, a charger, and a converter, by use of a coolant, also recovers ambient heat by use of the coolant, and performs a heat exchange between the refrigerant of an air-conditioning system and a coolant having a temperature raised by the recovered heat through a water cooling type heat exchanger.

Furthermore, in the heat pump system, the compressor compresses the refrigerant to which the heat of the coolant is delivered in the water cooling type heat exchanger at a high temperature and high pressure so that the high-temperature and high-pressure refrigerant can pass through an internal condenser within an air-conditioning casing. Accordingly, in the internal condenser, a heat exchange is performed between the high-temperature and high-pressure refrigerant and the air for heating, which is supplied to the interior of the vehicle by an air-conditioning blower. As a result, the air having a temperature raised by the heat exchange with the refrigerant while passing through the internal condenser is discharged to the interior of the vehicle, so that indoor heating is performed.

However, the conventional thermal management system has the following problems.

In a low temperature condition in which an outside air temperature is low upon driving, it is difficult to maximize performance of the heat pump due to a reduction in a flow rate of a coolant. That is, as the outside air temperature is lowered, the viscosity of the coolant becomes high, which results in a reduction in the flow rate of the coolant. In the heat pump system, the amount of heat recovered is increased or decreased depending on a flow rate of a coolant. When the flow rate of the coolant is decreased, the amount of heat recovered in the heat pump system is also decreased.

As the outside air temperature is lowered, a heating load is further increased. In the instant case, performance of the heat pump is more important. If the flow rate of the coolant is reduced due to a physical phenomenon, there is a demand for a technology capable of supplementing the reduction, that is, a technology capable of securing the flow rate of the coolant when the outside air temperature is low.

If the capacity of the electric water pump (EWP) is increased, the flow rate of the coolant may be increased. However, a cooling circuit needs to be optimized and improved because the capacity of the EWP cannot be thoughtlessly increased when noise, vibration, and harshness (NVH) performance is considered.

Furthermore, conventionally, when the heat pump system operates, an active air flap (AAF) at the front end portion of a vehicle is unconditionally opened, and the AAF is not controlled in more detail depending on a condition.

At the present time, when the heat pump system operates, the water cooling type heat exchanger recovers waste heat of the PE parts and heat of the air absorbed through the radiator, through a heat exchange between the coolant and the refrigerant. In the instant case, a flow rate of the coolant that circulates along the coolant lines may be greatly reduced due to a low temperature of outside air. As a result, sufficient performance of the heat pump system cannot be secured.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a thermal management system for a vehicle, which can solve a problem with performance degradation of a heat pump system caused by a reduction in a flow rate of a coolant upon low-temperature driving.

An object of the present invention is directed to providing a thermal management system for a vehicle, which can achieve active and efficient performance of a heat pump system depending on an outside air temperature.

Objects of the present invention are not limited to the aforementioned objects, and other technical objects not described above may be evidently understood by a person having ordinary knowledge in the art to which various exemplary embodiments of the present invention pertain (hereinafter an "ordinary skilled person) from the following description.

According to various exemplary embodiments of the present invention, there is provided a thermal management system for a vehicle, including a first cooling circuit configured to cool power electronic (PE) parts and to include a first radiator, a first coolant line through which a coolant is circulated between the first radiator and the PE parts, and a first electric water pump configured to circulate the coolant along the first coolant line, a heat pump system including a compressor configured to compress a refrigerant, an internal condenser configured to perform a heat exchange between the refrigerant compressed by the compressor and air supplied to the interior of a vehicle, a refrigerant line configured to circulate the refrigerant between the compressor and the internal condenser, and a heat exchanger configured to perform the heat exchange between the coolant and the refrigerant, a flow increase bypass line coupled between the first coolant lines on the entrance side and exit side of the PE parts, and a coolant control valve provided at a location where the flow increase bypass line is branched in the first coolant line and configured to control a flow direction of the coolant so that the coolant selectively bypasses the PE parts.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3A and FIG. 3B are diagrams in which operating and control states of the thermal management system according to various exemplary embodiments of the present invention are organized for each heating mode.

Figure 1:
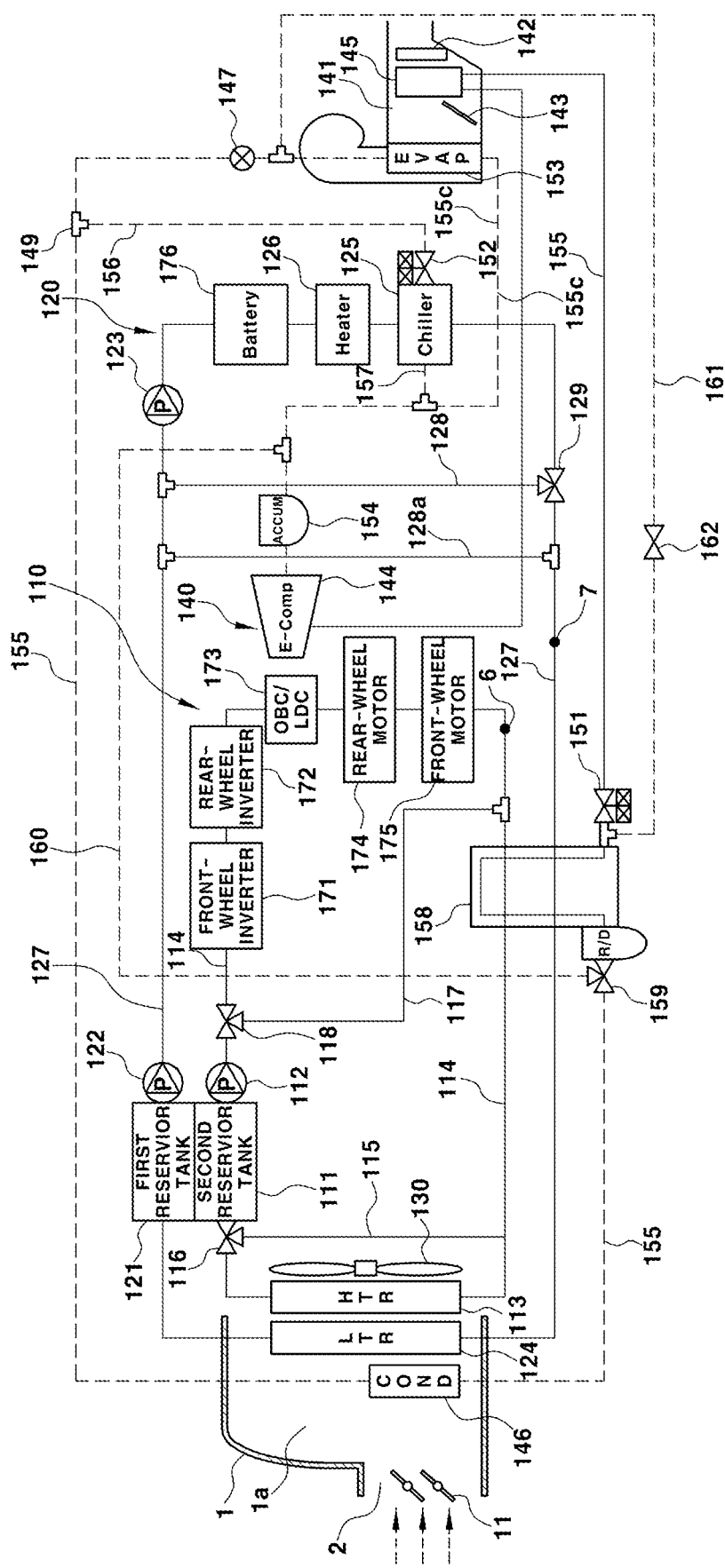
FIG. 1 is a schematic diagram illustrating a thermal management system for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural or functional descriptions presented in embodiments of an invention have been merely illustrated for the purpose of describing embodiments according to the concept of the present invention. Embodiments according to the concept of the present invention may be implemented in various forms. Furthermore, the exemplary embodiments should not be interpreted as being limited to exemplary embodiments described in the exemplary embodiment, and should be understood to include all changes, equivalents or substitutes included in the spirit and technical scope of the present invention.

In various exemplary embodiments of the present invention, terms, such as "first" and "second", may be used to describe various components, but the components are not limited to the terms. The terms are only used to distinguish one component from the other component. For example, a first component may be named a second component without departing from the scope of rights of the present invention. Likewise, a second component may be named a first component.

When it is said that one component is "connected" or "coupled" to the other component, it should be understood that one component may be directly connected or coupled" to the other component, but a third component may exist between the two components. In contrast, when it is described that one component is "directly connected (or coupled)" or "brought into direct contact with" the other component, it should be understood that a third component does not exist between the two components. Other expressions for describing relations between components, that is, "between ~", "just between ~", "adjacent to ~", and "neighboring ~", should be likewise construed.

The same reference numerals designate the same components throughout the specification. Terms used in the exemplary embodiment are for illustrating the exemplary embodiments and are not intended to limit the present invention. In the specification, the singular form, unless specially described otherwise in the context, also includes the plural form. The terms "comprise (or include)" and/or "comprising (or including)" used in the specification mean that an aforementioned element, step, operation and/or device does not exclude the existence or addition of one or more other elements, steps, operations and/or devices.

Embodiments of the present invention are specifically described below with reference to the accompanying drawings.

Figure 2:
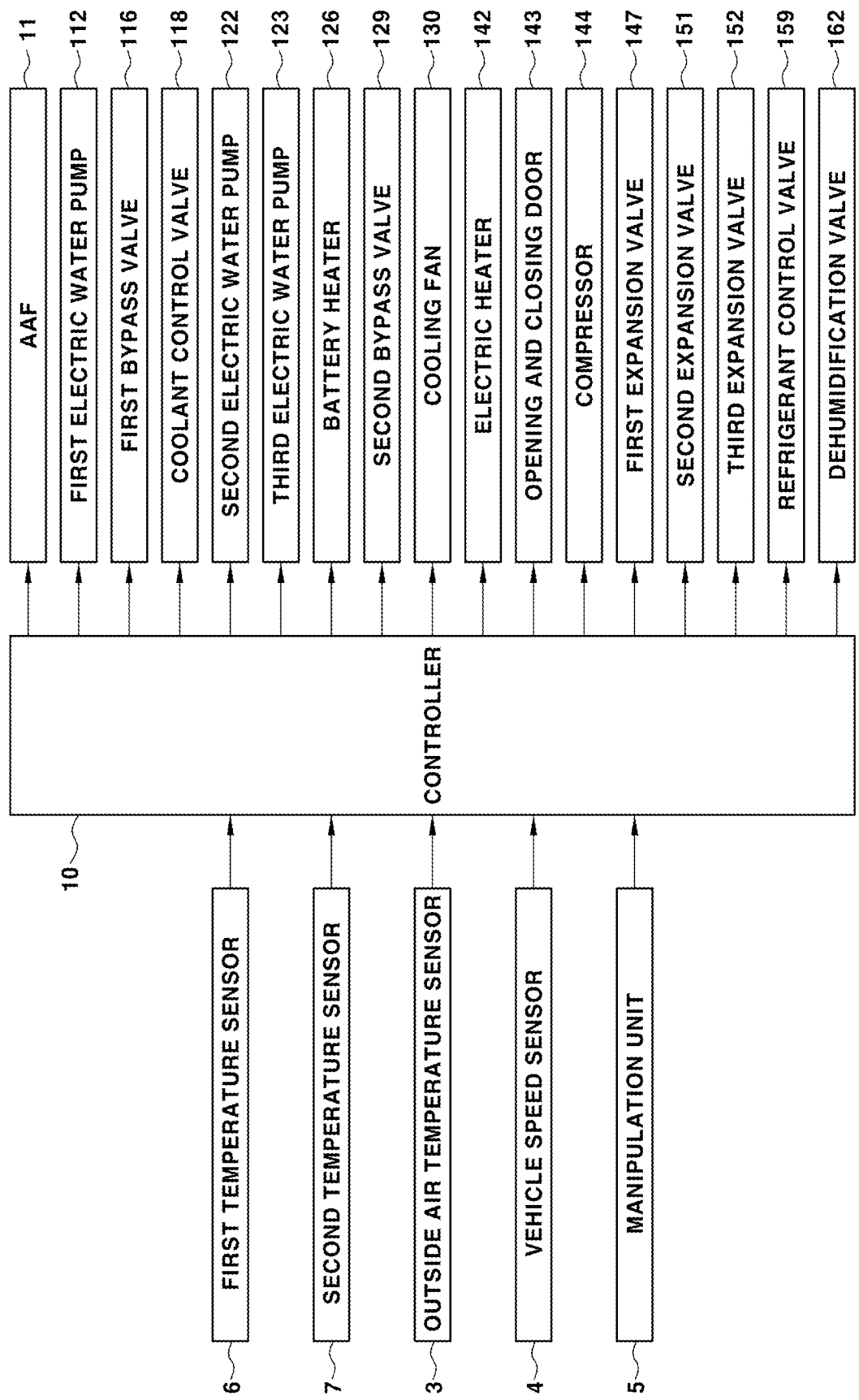
FIG. 2 is a block diagram illustrating major components of the thermal management system for a vehicle according to various exemplary embodiments of the present invention.

FIG. 1 is a schematic diagram illustrating a thermal management system for a vehicle according to various exemplary embodiments of the present invention. FIG. 2 is a block diagram illustrating major components of the thermal management system for a vehicle according to various exemplary embodiments of the present invention. Referring to FIG. 1, there are illustrated parts that perform thermal management, and a cooling circuit including coolant lines 114 and 127 and a refrigerant line 155 along which a coolant and a refrigerant flow.

The exemplary embodiment of FIG. 1 is a thermal management system which may be applied to an electric vehicle. In FIG. 1, reference numeral 1 denotes a vehicle front portion. Furthermore, in FIG. 1, reference numeral "2" denotes an outside air inlet which is disposed in the vehicle front portion 1 and through which an outside air is introduced. Reference numeral "3" denotes an active air flap (AAF) which selectively opens and closes the outside air inlet 2 of the vehicle front portion 1. An operation of the AAF 3 is controlled by a controller 10.

As illustrated, the thermal management system for an electric vehicle includes a water cooling type cooling system that performs thermal management and cooling on power electronic (PE) parts 171 to 175 and a battery 176 for driving the vehicle, along with an air-conditioning system 140 and heating system (e.g., an electric heater 142, that is, a main heating apparatus) of an air-conditioning apparatus. The cooling system is configured to manage heat of the power system by cooling or heating the PE parts and the battery through the circulation of the coolant. Furthermore, the cooling system may include parts for cooling or heating the battery 176 by use of the coolant as a medium, for example, a battery chiller 125 and a battery heater 126.

The cooling system includes cooling circuits 110 and 120 configured to include reservoir tanks 111 and 121 in which the coolant is stored, electric water pumps 112, 122, and 123 for forcedly delivering the coolant to circulate the coolant, radiators 113 and 124 and a cooling fan 130 for radiating heat of the coolant, the battery chiller 125 for cooling the battery, the battery heater 126 for raising a temperature of the battery, valves 116, 118, and 129 for controlling a flow of the coolant, and the coolant lines 114, 117, and 127 coupling these parts.

Furthermore, the cooling system further includes the controller 10 which is responsible for overall control over the thermal management system, including control over a temperature and flow of the coolant of the cooling circuits 110 and 120.

In the instant case, as illustrated in FIG. 2, the controller 10 controls operations of the AAF 11, the electric water pumps 112, 122, and 123, the battery heater 126, the electric heater 142, a compressor (E-Comp) 144, the cooling fan 130, the opening and closing door 143, etc., and also controls the valves 116, 118, 129, 147, 151, 152, 159, and 162 of the thermal management system. For example, the controller 10 may control a flow direction of the coolant by controlling operations of a first bypass valve 116 and a second bypass valve 129, that is, three-way valves.

The cooling system controls temperatures of the PE parts 171 to 175 and the battery 176 by passing the coolant through the coolant passages of the PE parts portions 171 to 175 for driving the vehicle and the battery 176 for supplying operating power to the PE parts. Furthermore, the cooling system may be configured to separate and individually cool the PE parts 171 to 175 and the battery 176 or to integrate and cool the PE parts and the battery, if necessary.

In the thermal management system of FIG. 1, the cooling system is a parallel type separation cooling system in which the two radiators 111 and 121 are disposed in an outside air introduction passage 1a of the vehicle front portion 1 and the parallel coolant lines 114 and 127 circulating the respective radiators are configured so that the PE parts 171 to 175 and the battery 176 may be separately cooled to increase a driving range of the vehicle and to improve a power ratio.

In the instant case, the PE parts, that is, a cooling target, may include a front-wheel motor 175 and a rear-wheel motor 174 that are driving sources for driving the vehicle, a front-wheel inverter 171 and a rear-wheel inverter 172 for driving and controlling the front-wheel motor 175 and the rear-wheel motor 174, respectively, and an on-board charger (OBC)/low voltage DC-DC converter (LDC) 173 for charging the battery 176. In the instant case, the OBC/LDC may be an integrated charger-converter unit (ICCU) having an integrated construction. Furthermore, although not illustrated in the drawing, the PE parts, that is, a cooling target, may further include a controller that needs to be cooled, such as an autonomous driving controller.

Referring to FIG. 1, it may be seen that coolant lines 114 and 127 are coupled to the two radiators, that is, the first radiator (high-temperature radiator (HTR)) 113 and the second radiator (low temperature radiator (LTR)) 124, respectively. The first radiator 113 and the second radiator 124 discharge heat from the coolant circulating along the coolant lines 114 and 127 through a heat exchange between outside air drawn in by the cooling fan 130 and the coolant within each of the radiators, and cools the coolant.

In the parallel type separation cooling system, the first radiator 113 is an HTR that performs the radiation of heat and cooling by passing the coolant having a relatively high temperature depending on a driving temperature (or a temperature of the coolant). The second radiator 124 is an LTR that performs the radiation of heat and cooling by passing a coolant having a relatively low temperature compared to the first radiator 113. In the instant case, the second radiator 124, that is, the LTR, may be disposed in front of the first radiator 113, that is, the HTR.

The first coolant line 114 is connected between the first radiator 113, the second reservoir tank 111, and the first electric water pump 112, and the front-wheel inverter 171, the rear-wheel inverter 172, the OBC/LDC 173, and the rear-wheel motor 174, and the front-wheel motor 175, that is, the PE parts, so that the coolant is circulated along the first coolant line.

Furthermore, the first electric water pump 112 for forcedly delivering the coolant for the circulation of the coolant is provided in the first coolant line 114. The first bypass valve 116 for selectively running the coolant to the first radiator 113 and a first bypass line 115 for coupling the first coolant lines at an upstream end portion (inlet) and a downstream end portion (outlet) of the first radiator 113 are provided in the first coolant line 114.

The first bypass valve 116 is a valve provided at the location of a branch point at which the first bypass line 115 is branched from the first coolant line 114. The first bypass valve 116 may be an electronic three-way valve which is controlled by the controller 10 and can distribute a flow rate. Accordingly, the first cooling circuit 110 for cooling the PE parts 171 to 175 by circulating the coolant through the first coolant line 114 is configured.

In the first cooling circuit 110, the coolant forcedly delivered by the first electric water pump 112 circulates along the first coolant line 114 and sequentially passes through the PE parts, such as the front-wheel inverter 171, the rear-wheel inverter 172, the OBC/LDC 173, the rear-wheel motor 174, and the front-wheel motor 175. While passing through the PE parts 171 to 175, the coolant sequentially cools the PE parts. The high-temperature coolant that has cooled the PE parts 171 to 175 is cooled through a heat exchange with the air and the radiation of heat, while passing through the first radiator 113.

The second coolant line 127 connects the second radiator 124, and the first reservoir tank 121, the second electric water pump 122, the third electric water pump 123, the battery 176, the battery heater 126, and the battery chiller 125 so that the coolant is circulated along the second coolant line 127. In the instant case, the battery 176 supplies operating power to PE parts, such as the front-wheel motor 175 and the rear-wheel motor 174. To the present end, although electric wires are not illustrated in the drawing, the battery 176 is coupled to the PE parts 171 to 175 through the electric wires. For example, the battery 176 is coupled to the front-wheel motor 175 and the rear-wheel motor 174 through the front-wheel inverter 171 and the rear-wheel inverter 172, respectively, in a way to charge and discharge the front-wheel motor 175 and the rear-wheel motor 174. Furthermore, the battery 176 is coupled to the OBC/LDC 173 through an electric wire.

Furthermore, the electric water pumps 122 and 123 for forcedly delivering the coolant to circulate the coolant are provided in the second coolant line 127. The second bypass valve 129 for selectively running the coolant to the second radiator 124 and a second bypass line 128 coupling the second coolant lines at the front end portion (i.e., entrance side) and rear end portion (i.e., exit side) of the second radiator 124 are provided in the second coolant line 127.

In the instant case, the second bypass valve 129 is provided at the location of a branch point at which the second bypass line 128 is branched from the second coolant line 127, and may be an electronic three-way valve which is controlled by the controller 10 and can distribute a flow rate.

Accordingly, the second cooling circuit 120 for cooling the battery 176 by circulating the coolant through the second coolant line 127 is configured. In the second cooling circuit 120, a plurality of electric water pumps, that is, the first electric water pump 112 and the second electric water pump 122, may be provided in the second coolant line 127.

In the second cooling circuit 120, the coolant forcedly delivered by the first and second electric water pumps 122 and 123 passes through the battery 176 while circulating along the second coolant line 127. While the coolant passes through the battery 176, the battery 176 is cooled by the coolant. Furthermore, the high-temperature coolant that has cooled the battery 176 is cooled through a heat exchange with the air and the radiation of heat, while passing through the second radiator 124.

As described above, a temperature of the coolant that has cooled the battery 176 is relatively lower than a temperature of the coolant that has cooled the PE parts 171 to 175. Accordingly, the second radiator 124 that radiates heat of a coolant having a relatively low temperature may be called an LTR. The first radiator 113 that radiates heat of a coolant having a relatively high temperature may be called an HTR.

In FIG. 1, reference numeral 126 is the battery heater 126, which may be provided in the second coolant line 127 between the battery 176 and the battery chiller 125. The battery heater 126 is turned on when a temperature of the battery 176 needs to be raised, and enables the coolant heated by heating the coolant circulated along the second coolant line 127 to flow into a coolant passage within the battery 176. The battery heater 126 may be an electric type heater driven by power supplied thereto. The battery heater 126 heats a heater that heats the coolant, but the coolant heated by the battery heater 126 raises a temperature of the battery 176. As a result, the coolant heater 126 is for eventually raising a temperature of the battery 176.

In the thermal management system according to various exemplary embodiments of the present invention, the first bypass valve 116 may be disposed in the second coolant line 114 between the first radiator 113 and the second reservoir tank 111. The first bypass line 115 and the first bypass valve 116 are parts that enable the coolant which has passed through the PE parts 171 to 175 to selectively bypass (or skip) the first radiator 113, that is, an HTR.

When the first bypass valve 116 enables the first radiator 113 and the second reservoir tank 111 to communicate with each other, the coolant is circulated along the path of the second coolant line 114 including the first radiator 113. In contrast, when the first bypass valve 116 enables the first bypass line 115 and the second reservoir tank 111 to communicate with each other, the coolant is circulated along the path of the second coolant line 114 that bypasses the first radiator 113.

Furthermore, the second bypass line 128 and the second bypass valve 129 are parts that enable the coolant that has passed through the battery 176 to selectively bypass (or skip) the heat exchanger 158 and the second radiator 124, that is, an LTR.

When the second bypass valve 129 enable the second coolant line 127 on the part of the heat exchanger 158 and the second radiator 124, and the second coolant line 127 on the part of the battery chiller 125, the battery heater 126, and the battery 176 to communicate with each other, the coolant is circulated along the path of the second coolant line 114, including the heat exchanger 158 and the second radiator 124. In contrast, when the second bypass valve 129 enables the second coolant line 127 on the part of the battery chiller 125, the battery heater 126, and the battery 176 to communicate with the second bypass line 128, the coolant is circulated along the path of the second coolant line 114 that bypasses the heat exchanger 158 and the second radiator 124.

Furthermore, in the thermal management system according to various exemplary embodiments of the present invention, the second reservoir tank 111, the first bypass valve 116 disposed on the entrance side of the second reservoir tank 111, the first electric water pump 112 disposed on the exit side of the second reservoir tank 111, and the first reservoir tank 121 and the second electric water pump 122 disposed on the exit side of the first reservoir tank 121 may be provided as an integrated module.

Furthermore, a separate bypass line, that is, a third bypass line 128a, may be additionally coupled between the front end portion (i.e., entrance side) and rear end portion (i.e., exit side) of the second radiator 124 in the second coolant line 127. The third bypass line 128a may be provided to couple the second coolant line 127 between the second radiator 124 and the battery 176 and the second coolant line 127 between the battery chiller 125 and the second radiator 124.

The third bypass line 128a may be provided to couple the second coolant line 127 between the second electric water pump 122 and the third electric water pump 123 and the second coolant line 127 between the battery chiller 125 and the heat exchanger 158. In the instant case, the location of a branch point at which the third bypass line 128a is branched in the second coolant line 127 between the second electric water pump 122 and the third electric water pump 123 may be a location between the second electric water pump 122 and a branch point at which the second bypass line 128 is branched in the second coolant line 127.

As a result, the second coolant line 127 may be divided into a first circulation line 127a and a second circulation line 127b on the basis of the second bypass line 128 and the third bypass line 128a. In the instant case, the first circulation line 127a is a coolant circulation line connected along the path of the first reservoir tank 121, the second electric water pump 122, the third bypass line 128a, the heat exchanger 158, and the second radiator 125, that is, an LTR. Furthermore, the second circulation line 127b is a coolant circulation line connected along the path of the third electric water pump 122, the battery 176, the battery heater 126, the battery chiller 125, the second bypass valve 129, and the second bypass line 128.

Furthermore, the thermal management system according to various exemplary embodiments of the present invention may include the air-conditioning system 140. The air-conditioning system 140 includes, as major components, the compressor (E-Comp) 144 that compresses the refrigerant, an external condenser (COND) 146 that liquefies the refrigerant compressed by the compressor 144 by condensing the compressed refrigerant, a first expansion valve 147 that rapidly expands the refrigerant condensed and liquefied by the external condenser 146, and an evaporator (EVAP) 153 that cools the air ventilated into the interior of the vehicle by use of evaporative latent heat of the refrigerant, while evaporating the refrigerant expanded by the first expansion valve 147.

In the instant case, the external condenser 146 is provided in the outside air introduction passage 1a of the vehicle front portion 1 so that outside air can pass through the outside air introduction passage. The external condenser 146 may be disposed in front of the second radiator 124 in the outside air introduction passage 1a of the vehicle front portion 1. In the instant case, the first radiator 113 may be disposed in the rear of the second radiator 124. Accordingly, outside air entered through the outside air inlet 2 sequentially passes through the outside air introduction passage 1a, the external condenser 146, the second radiator 124, and the first radiator 113.

Furthermore, an internal condenser (ICOND) 145 is disposed in the rear of the evaporator 153 within an air-conditioning casing 141. Accordingly, the air ventilated by the air-conditioning blower 148 may sequentially pass through the evaporator 153 and the internal condenser 145, and may be then discharged to the interior of the vehicle.

Furthermore, the electric heater 142 is disposed in the rear of the internal condenser 145 within the air-conditioning casing 141. The electric heater 142 is used as a main heating apparatus, that is, a heater (PTC heater) for indoor heating. Accordingly, in a heating mode, after air for heating ventilated by the air-conditioning blower 148 is heated by the electric heater 142 by driving the electric heater 142, the air for heating is discharged to the interior of the vehicle. Accordingly, the interior of the vehicle may be heated.

In contrast, in a cooling mode (air-conditioning mode), by driving the compressor 144 and simultaneously circulating the refrigerant toward the evaporator 153 through the first expansion valve 147, air ventilated by an air-conditioning blower 148 is cooled (i.e., a heat exchange with the refrigerant) by the evaporator 153 and then discharged to the interior of the vehicle. Accordingly, the interior of the vehicle may be cooled.

Furthermore, while a high-temperature and high-pressure refrigerant compressed by the compressor 144 of the air-conditioning system 140 passes through the inside of the internal condenser 145, a heat exchange may be performed between the high-temperature and high-pressure refrigerant and the air ventilated by the air-conditioning blower 148. At the instant time, after being heated by the refrigerant, the air may be discharged to the interior of the vehicle. Accordingly, the internal condenser 145 may be used to heat the interior of the vehicle along with the electric heater 142, that is, a main heating apparatus.

Furthermore, an opening and closing door 143 is disposed between the evaporator 153 and the internal condenser 145 within the air-conditioning casing 141. The opening and closing door 143 selectively opens and closes a passage passing through the internal condenser 145. In an operation of the opening and closing door 143, in the heating mode of the vehicle, the opening and closing door 143 is opened so that air passing through the evaporator 153 passes through the internal condenser 145 and the electric heater 142. In the cooling mode of the vehicle, the opening and closing door 143 closes the portion of the internal condenser 145 and the electric heater 142 so that air cooled through the evaporator 153 is directly discharged to the interior of the vehicle without passing through the internal condenser 145 and the electric heater 142.

In the air-conditioning system 140, a refrigerant line 155 may connect the compressor 144, the external condenser 146, the first expansion valve 147, and the evaporator 153 so that the refrigerant is circulated along the refrigerant line 155. An accumulator 154 may be provided in the refrigerant line 155 between the compressor 144 and the evaporator 153.

Furthermore, the internal condenser 145 may be coupled to the external condenser 146 through the refrigerant line 155. In the instant case, the internal condenser 145 may be disposed in the refrigerant line 155 between the compressor 144 and the external condenser 146, and may be disposed in the rear of the evaporator 153 and at the front of the electric heater 142 within the air-conditioning casing 141.

As a result, in the air-conditioning system 140, the refrigerant may be circulated along the path of the accumulator 154, the compressor 144, the internal condenser 145, the heat exchanger 158, the external condenser 146, the first expansion valve 147, the evaporator 153, and the accumulator 154. The compressor 144 compresses the refrigerant having a gaseous state at a high temperature and high pressure. The accumulator 154 supplies the compressor 144 with only the refrigerant having a gaseous state, improving efficiency and durability of the compressor 144.

The external condenser 146 condenses the refrigerant, passing through the internal condenser 145 after being compressed by the compressor 144, through a heat exchange with outside air drawn in by the cooling fan 130. The first expansion valve 147 expands the refrigerant condensed by the external condenser 146. The low-temperature and low-pressure refrigerant passing through the first expansion valve 147 is supplied to the evaporator 153.

Accordingly, a heat exchange is performed between the refrigerant expanded by the first expansion valve 147 in the evaporator 153 and the air for cooling ventilated to the interior of the vehicle by the air-conditioning blower 148. The air cooled through the heat exchange is discharged to the interior of the vehicle, so that indoor cooling may be performed. The first expansion valve 147 may be a solenoid valve-integrated expansion valve.

The thermal management system includes the battery chiller 125 for cooling the coolant that circulates along the second coolant line 127 through a heat exchange with the refrigerant to cool the battery 176. The battery chiller 125 may be provided in the second coolant line 127 and the refrigerant line 155.

The battery chiller 125 may be provided in the second coolant line 127 for cooling the battery 176 and in the refrigerant line 155 of the air-conditioning system 140. In the instant case, the refrigerant line 155 in which the battery chiller 125 is provided may become separate branch refrigerant lines 156 and 157 branched from the refrigerant line 155 of the air-conditioning system 140.

In the instant case, the branch refrigerant lines 156 and 157 in which the battery chiller 125 is provided may be branch refrigerant lines which are branched from the refrigerant line 155 between the external condenser 146 and the first expansion valve 147 and are coupled to the refrigerant line 155 between the evaporator 153 and the accumulator 154.

In the instant case, the refrigerant entrance of the battery chiller 125 is coupled to the refrigerant line 155 at a junction 149 between the external condenser 146 and the first expansion valve 147 through the third expansion valve 152 and the branch refrigerant line 156 on the entrance side of the battery chiller 125. Furthermore, the refrigerant exit of the battery chiller 125 is coupled to the refrigerant line 155 between the evaporator 153 and the accumulator 154 through the branch refrigerant line 157 on the exit side of the battery chiller 125.

That is, the branch refrigerant line 156 on the entrance side of the battery chiller 125 is a branch refrigerant line, which is branched from the refrigerant line 155 between the external condenser 146 and the first expansion valve 147 and coupled to the refrigerant entrance of the battery chiller 125 through a third expansion valve 152. The branch refrigerant line 157 on the exit side of the battery chiller 125 is a branch refrigerant line, which is branched from the refrigerant line 155 between the evaporator 153 and the accumulator 154 and coupled to the refrigerant exit of the battery chiller 125.

The third expansion valve 152 may be provided on the refrigerant entrance of the battery chiller 125 or the entrance side of the branch refrigerant line 156, and expands the refrigerant introduced into the battery chiller 125 through the branch refrigerant line 156 on the entrance side of the battery chiller 125, which is branched from the refrigerant line 155, in the cooling mode. Accordingly, the refrigerant introduced into the third expansion valve 152 through the branch refrigerant line 156 on the entrance side of the battery chiller 125 may be introduced into the battery chiller 125 in the state which the refrigerant has been expanded and simultaneously a temperature thereof has been lowered.

Accordingly, the refrigerant condensed by the external condenser 146 is introduced from the refrigerant line 155 to the third expansion valve 152 through the branch refrigerant line 156 on the entrance side of the battery chiller 125. When the low-temperature and low-pressure refrigerant expanded while passing through the third expansion valve 152 is introduced into the battery chiller 125, the refrigerant is discharged to the refrigerant line 155 again through the branch refrigerant line 157 on the exit side of the battery chiller 125 after passing through the inside of the battery chiller 125.

As described above, the second coolant line 127 is coupled to the battery chiller 125. Accordingly, the coolant circulates along the second coolant line 127 within the battery chiller 125 to cool the battery 176. As a result, a heat exchange may be performed between the coolant passing through the inside of the battery chiller 125 and the refrigerant having a low temperature. The coolant cooled through the heat exchange with the refrigerant in the battery chiller 125 may be circulated along the second coolant line 127. The battery 176 may be cooled by the cooled coolant.

Furthermore, the thermal management system may further include the heat exchanger 158 provided between the first coolant line 114, the second coolant line 127, and the refrigerant line 155 and configured to perform a heat exchange between the coolant and the refrigerant.

A location where the heat exchanger 158 is disposed in the first coolant line 114 coupled to the first radiator 113 may be a location connected from the PE parts 171 to 175 to the entrances of the first bypass valve 116 and the first radiator 113. A location where the heat exchanger 158 is disposed in the second coolant line 127 coupled to the second radiator 124 may be a location connected from the battery chiller 125 and the second bypass valve 129 to the entrance of the second radiator 124.

Furthermore, a location where the heat exchanger 158 is disposed in the refrigerant line 155 may be a refrigerant line between the internal condenser 145 and the external condenser 146. In the instant case, the refrigerant entrance of the heat exchanger 158 is coupled to the internal condenser 145 through the refrigerant line 155. The refrigerant exit of the heat exchanger 158 is coupled to the external condenser 146 through the refrigerant line 155.

Furthermore, a second expansion valve 151 may be provided in the refrigerant line 155 on the entrance side of the heat exchanger 158 coupled to the refrigerant entrance of the heat exchanger 158. Furthermore, a dehumidification line 161 may be branched from the refrigerant line 155 on the entrance side of the heat exchanger 158, and may be coupled to the refrigerant line 155 between the first expansion valve 147 and the evaporator 153.

A location where the dehumidification line 161 is branched from the refrigerant line 155 on the entrance side of the heat exchanger 158 may be a refrigerant line between the entrance of the heat exchanger 158 and the second expansion valve 151. Accordingly, the dehumidification line 161 becomes a separate refrigerant line connected from the refrigerant line 155 between the entrance of the heat exchanger 158 and the second expansion valve 151 to the refrigerant line 155 between the first expansion valve 147 and the evaporator 153.

Furthermore, a refrigerant control valve 159 may be provided at the exit of the heat exchanger 158 or in the refrigerant line 155 connected from the exit of the heat exchanger 158 to the external condenser 146. The refrigerant control valve 159 may be a three-way valve. Furthermore, a dehumidification valve 162 may be provided in the dehumidification line 161 branched from the refrigerant line 155 on the entrance side of the heat exchanger 158. The dehumidification valve 162 may be a two-way valve that opens or closes the dehumidification line 161.

Furthermore, a separate coupling line 160 is coupled to the refrigerant control valve 159. The coupling line 160 is coupled to the refrigerant line 155 between the evaporator 153 and the accumulator 154. That is, the exit of the heat exchanger 158, the coupling line 160, and the refrigerant line 155 toward the external condenser 146 are coupled to the refrigerant control valve 159 disposed on the exit side of the heat exchanger 158.

The refrigerant control valve 159 controls a flow direction of the refrigerant passing through the heat exchanger 158, and may control the flow direction of the refrigerant so that the refrigerant passing through the heat exchanger 158 flows into only a selected one of the coupling line 160 and the refrigerant line 155 toward the external condenser 146. The coupling line 160 may be said to be a kind of bypass line that makes the refrigerant passing through the heat exchanger 158 bypass (or skip) the external condenser 146 and the first expansion valve 147, that is, portions of the air-conditioning system, and the evaporator 153 without passing through the external condenser 146, the first expansion valve 147, and the evaporator 153.

Furthermore, in the thermal management system, the heat exchanger 158 plays a role as a water cooling type condenser in the cooling mode. That is, the refrigerant is condensed by the coolant. In the cooling mode, the coolant flowing along the two coolant lines 114 and 127 passes through the heat exchanger 158. While the refrigerant passing through the internal condenser 145 passes through the heat exchanger 158 through the refrigerant line 155 and the second expansion valve 151, a heat exchange is performed between the coolant and the refrigerant. In the instant case, the heat exchange is a heat exchange by which the refrigerant is additionally condensed (i.e., the refrigerant is cooled) by the coolant to which heat from the refrigerant is delivered.

In contrast, in the cooling mode, the coolant flowing along the two coolant lines 114 and 127 passes through the heat exchanger 158. While the refrigerant supplied through the refrigerant line 155 and the second expansion valve 151 after passing through the internal condenser 145 passes through the heat exchanger 158, a heat exchange may be performed between the coolant and the refrigerant. In the instant case, the heat exchange is a heat exchange by which the refrigerant is heated by the coolant that delivers heat to the refrigerant.

As described above, in the cooling mode, the heat exchanger 158 may play a role as a waste heat recovery chiller for recovering waste heat through a coolant and a refrigerant by facilitating heat of the coolant to be delivered to the refrigerant. Furthermore, in the cooling mode, components through which a coolant and a refrigerant circulate in the thermal management system operate as a heat pump system. While the components operate as the heat pump system, waste heat of the PE parts 171 to 175 and the battery 176 may be recovered through the coolant and the refrigerant, and may be used to heat the interior of the vehicle through the internal condenser 145.

In the instant case, the heat pump system may have a construction, including the compressor 144, the internal condenser 145 provided within the air-conditioning casing 141 and provided to allow a refrigerant compressed by the compressor 144 to pass through the internal condenser, the refrigerant line 155 coupled between the compressor 144 and the internal condenser 145 in a way to allow the refrigerant to be circulated along the refrigerant line 155, and the heat exchanger 158 provided to allow the coolant lines 114 and 127 of the cooling system and the refrigerant line 155, connected from the internal condenser 145 to the external condenser 146, to pass through the heat exchanger and configured to perform a heat exchange between the coolant and the refrigerant.

Furthermore, the heat pump system may further include the second expansion valve 151 provided in the refrigerant line 155 on the entrance side of the heat exchanger 158, that is, the refrigerant line 155 between the internal condenser 145 and the heat exchanger 158.

Furthermore, in the thermal management system according to various exemplary embodiments of the present invention, a separate flow increase bypass line 117 coupling the first coolant line 114 on the entrance side of the PE part 171 and the first coolant line 114 on the exit side of the PE part 175 is further provided.

The flow increase bypass line 117 is provided between the first coolant line 114 connected from the exit of the first radiator 113 to a PE part (the front-wheel inverter 171 in FIG. 1) and the first coolant line 114 connected from a PE part (the front-wheel motor 175 in FIG. 1) to the heat exchanger 158.

Furthermore, a coolant control valve 118, that is, a three-way valve, is provided at the location of a branch point at which the flow increase bypass line 117 is branched in the first coolant line 114. The coolant control valve 118 may be an electronic three-way valve having an opening state controlled by the controller 10.

A location where the flow increase bypass line 117 is branched in the first coolant line 114 between the exit of the first radiator 113 and the PE part 171 is a location on the entrance side of the PE part 171, which is also a location on the exit side of the first electric water pump 112. The coolant control valve 118 may be provided at the branch location.

Furthermore, in various exemplary embodiments of the present invention, a first temperature sensor 6 may be provided in the first coolant line on the exit side of the PE parts. In the instant case, the location of the first temperature sensor 6 may be a location between the PE part 175 and a branch point at which the flow increase bypass line 117 is branched in the first coolant line 114 on the entrance side of the heat exchanger 158.

Furthermore, a second temperature sensor 7 for detecting a temperature of the coolant may be provided in the second coolant line 127. The second temperature sensor 7 may be provided at a location on the entrance side of the heat exchanger 158 in the second coolant line 127.

As illustrated in FIG. 2, the first temperature sensor 6 and the second temperature sensor 7 are coupled to the controller 10 in a way to input signals to the controller 10. Accordingly, the controller 10 may obtain information on a temperature of the coolant at the location where each temperature sensor is provided by receiving the signal output by the first temperature sensor 6 and the signal output by the second temperature sensor 7.

Furthermore, the thermal management system of the present invention may further include an outside air temperature sensor 3 for detecting an outside air temperature, a vehicle speed sensor 4 for detecting a vehicle speed, and a manipulation unit 5 provided in the vehicle to allow a user, such as a driver, to manipulate the thermal management system, for control of the thermal management system. In the instant case, the manipulation unit 5 may be a switch, a button, a dial or the like which is manipulated by a user to operate indoor heating, etc. As illustrated in FIG. 2, the outside air temperature sensor 3 and the vehicle speed sensor 4, and the manipulation unit 5 are coupled to the controller 10 in a way to input signals to the controller 10.

The construction of the thermal management system according to various exemplary embodiments of the present invention has been described in detail so far. Operating states and control processes of the thermal management system for each heating mode are described below.

FIG. 3A and FIG. 3B are diagrams in which operating and control states of the thermal management system according to various exemplary embodiments of the present invention are organized for each heating mode. FIG. 4, FIG. 5, FIG. 6 and FIG. 7 are diagrams illustrating flow states of a coolant and a refrigerant for each heating mode in the thermal management system according to various exemplary embodiments of the present invention. FIG. 8 is a flowchart illustrating a process of controlling the thermal management system according to various exemplary embodiments of the present invention.

In the following description, a temperature of a coolant detected by the first temperature sensor 6 is called as a "first detection temperature." A temperature of a coolant detected by the second temperature sensor 7 is called as a "second detection temperature." Furthermore, the active air flap 11 is abbreviated as the "AAF."

In FIG. 3A and FIG. 3B, an "outside air temperature" is a temperature detected by the outside air temperature sensor 3. "α" and "β" are a first setting temperature and a second setting temperature previously set by the controller 10, respectively. "COP" indicates a coefficient of performance. In FIG. 3B, COP values are illustrative and are values which may be changed upon real vehicle tuning and application. In FIG. 3B, a "first EWP" means the first electric water pump 112, and a "second EWP" means the second electric water pump 122. In FIG. 3A and FIG. 3B, "PE" means the PE parts 171 to 175.

Furthermore, in FIG. 4, FIG. 5, FIG. 6, and FIG. 7, sections indicated by thick solid lines in the coolant lines 114 and 127 and the refrigerant line 155 indicate that a coolant and a refrigerant are circulated along the corresponding lines. Furthermore, it may be said that sections indicated by thin solid lines in the coolant lines 114 and 127 indicate that a coolant is not circulated. Furthermore, it may be said that a section indicated by dotted lines in the refrigerant line 155 indicates that a refrigerant is not circulated.

First, when a user operates indoor heating (the heat pump system) by manipulating the manipulation unit 5, the controller 10 selects and determines a heating mode based on temperatures of the coolant detected by the first temperature sensor 6 and the second temperature sensor 7, respectively, and an outside air temperature detected by the outside air temperature sensor 3.

Among heating modes provided in various exemplary embodiments of the present invention, a first mode and a second mode are performed in a condition in which a first detection temperature is higher than an "outside air temperature+α." An area in which the execution condition is satisfied may be said to be an area in which a temperature of the PE parts 171 to 175, that is, a temperature of a PE heat source, is higher than a setting level.

Furthermore, when the condition in which the first detection temperature is higher than the "outside air temperature+α" is satisfied and a second detection temperature is an "outside air temperature−β" or less, this corresponds to a condition and area in which air heat recovery is possible. In the instant case, the first mode is selected by the controller 10. In contrast, when the condition in which the first detection temperature is higher than the "outside air temperature+α" is satisfied and the second detection temperature is higher than the "outside air temperature−β", this corresponds to a condition and area in which air heat recovery is impossible. In the instant case, the second mode is selected by the controller 10.

In the first mode, the controller 10 operates both the first electric water pump 112 and the second electric water pump 122 so that a coolant is circulated along predetermined paths of the first coolant line 114 and the second coolant line 127, respectively. In the instant case, the coolant passes only through the second radiator 124 of the first radiator 113 and the second radiator 124, so that air heat recovery using the second radiator 124 is performed.

In contrast, in the second mode, the controller 10 operates the first electric water pump 112 so that the coolant is circulated along a predetermined path (i.e., a path that does not pass through the first radiator) of the first coolant line 114, but the second electric water pump 122 maintains a stop state so that the coolant is not circulated along the path of the second coolant line that passes through the second radiator 124.

Accordingly, in the first mode, air heat may be recovered using PE heat recovery and the second radiator 124. In the second mode, PE heat recovery is performed, but air heat recovery using the second radiator 124 is not performed. Furthermore, the controller 10 opens the AAF 11 in the first mode in which the air heat recovery is performed, and closes the AAF 11 in the second mode in which air heat recovery is not performed.

Figure 4:
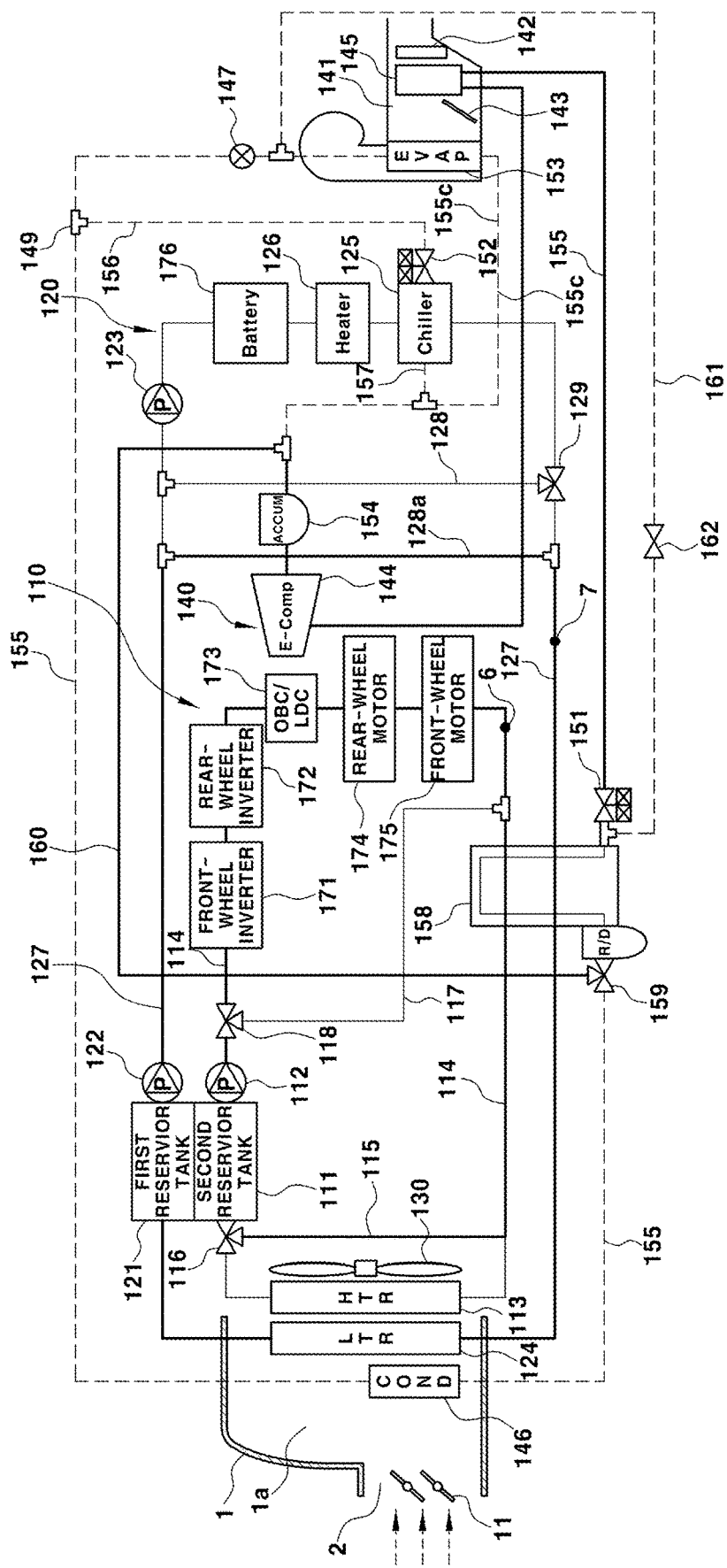
FIG. 4, FIG. 5, FIG. 6 and FIG. 7 are diagrams illustrating flow states of a coolant and a refrigerant for each heating mode in the thermal management system according to various exemplary embodiments of the present invention.

FIG. 4 is a diagram illustrating flow states of a coolant and a refrigerant in the first mode. In the first mode, the controller 10 drives the compressor 144, opens the second expansion valve 151, and controls an opening state of the refrigerant control valve 159 so that the portion of the refrigerant line 155 coupled to the external condenser 146 is blocked and the portion of the coupling line 160 is opened. Accordingly, the refrigerant is circulated along the path of the compressor 144, the internal condenser 145, the second expansion valve 151, the heat exchanger 158, the refrigerant control valve 159, the accumulator 154, and then the compressor 144 in all the refrigerant lines 155. Such a circulation of the refrigerant is the same even in the second to fourth modes to be described later.

Furthermore, in the first mode, the controller 10 circulates the coolant by driving the first electric water pump 112 and the second electric water pump 122, but controls an opening state of the coolant control valve 118 so that the portion of the flow increase bypass line 117 is blocked and the first coolant line 114 on the portion of the first electric water pump 112 and the first coolant line 114 on the portion of the PE parts 171 to 175 communicate with each other.

Furthermore, the controller 10 controls an opening state of the first bypass valve 116 so that the portion of the first bypass line 115 is opened in a way that the coolant can bypass (or skip) the first radiator 113. Accordingly, the coolant of the first cooling circuit 110 is circulated along the path of the first electric water pump 112, the coolant control valve 118, the PE parts 171 to 175, the heat exchanger 158, the first bypass line 115, the first bypass valve 116, the first reservoir tank, and then the first electric water pump 112.

Furthermore, in the first mode, the controller 10 controls an opening state of the second bypass valve 129 so that the portion of the second bypass line 128 is opened. Accordingly, the second coolant line 127 and the second bypass line 128 that connect the third electric water pump 123, the battery 176, the battery heater 126, the battery chiller 125, and the second bypass valve 129 are separated from the remaining second coolant line 127 passing through the second radiator 124 and the heat exchanger 158.

Accordingly, in the first mode, the coolant of the second cooling circuit 120, that is, the coolant of the second coolant line 127, is circulated along the path of the second electric water pump 122, the third bypass line 128a, the heat exchanger 158, the second radiator 124, the first reservoir tank 121, and then the second electric water pump 122.

Accordingly, in the first mode, after heat of the PE parts is delivered to the coolant, the heat may be delivered to the refrigerant in the heat exchanger 158. Thereafter, the heat delivered to the refrigerant may be used for heating in the internal condenser 145, facilitating a PE heat recovery operation for heating using the recovered heat of the PE parts 171 to 175.

Furthermore, in the state in which the AAF 11 has been opened, the coolant may absorb heat of outside air (or air) while passing through the second radiator 124, that is, an LTR. Thereafter, after moving along the second coolant line 127, the coolant may deliver, to the refrigerant, the heat absorbed from the outside air in the heat exchanger 158. Thereafter, the heat delivered to the refrigerant may be used for heating in the internal condenser 145, facilitating an air heat recovery operation for heating using the recovered heat of the outside air.

Figure 5:
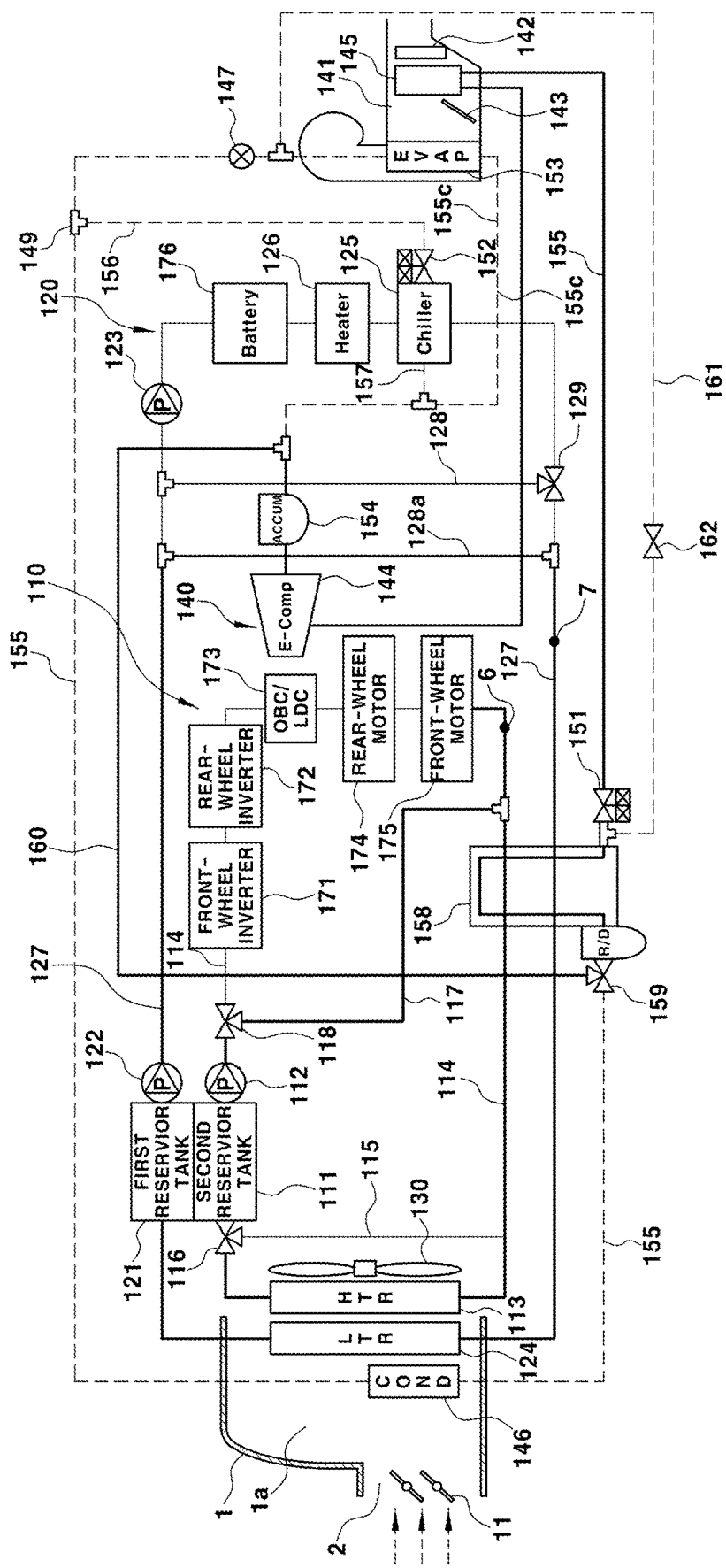

FIG. 5 is a diagram illustrating flow states of a coolant and a refrigerant in the second mode. The second mode is selected in the outside air temperature and coolant temperature (second detection temperature) condition in which air heat recovery is impossible.

The second mode is different from the first mode in that the second electric water pump 122 is stopped and a coolant does not flow along the path of the second coolant line that passes through the second radiator 124 as in FIG. 5. Accordingly, in the second mode of FIG. 5, air heat recovery using the second radiator 124 is not performed.

Next, the third mode and the fourth mode are performed in a condition in which a first detection temperature is an "outside air temperature+α" or less. An area in which the execution condition is satisfied may be said to be an area in which a temperature of the PE parts 171 to 175, that is, a temperature of the PE heat source, is equal to or less than a setting level. As described above, the condition and area in which the first detection temperature is the "outside air temperature+α" or less may be the to be a condition and area in which PE heat recovery is not performed because a temperature of the PE parts 171 to 175 is too low. Only air heat recovery is possible in the condition and area.

Furthermore, when a first detection temperature is an "outside air temperature+α" or less and also a second detection temperature is an "outside air temperature−β" or less, this corresponds to a condition and area in which air heat recovery is possible. In the instant case, the third mode is selected by the controller 10. In contrast, when the first detection temperature is the "outside air temperature+α" or less and also the second detection temperature is higher than the "outside air temperature−β", this corresponds to a condition and area in which air heat recovery is impossible. In the instant case, the fourth mode is selected by the controller 10. The third mode is a mode in which air heat is recovered using both the first radiator 113 and the second radiator 124. The fourth mode is a mode in which air heat recovery is not performed as well as PE heat recovery.

In the third mode, the controller 10 drives both the first electric water pump 112 and the second electric water pump 122 so that the coolant is circulated along predetermined paths of the first coolant line 114 and the second coolant line 127. In contrast, in the fourth mode, the controller 10 stops both the first electric water pump 112 and the second electric water pump 122. Accordingly, both the first radiator 113 and the second radiator 124 are not used, and the coolant is not circulated along the path of the second coolant line passing through the second radiator 124 in addition to the path of the first coolant line passing through the PE parts 171 to 175.

Accordingly, in the third mode, PE heat recovery is impossible, but air heat recovery using the first radiator 113 and the second radiator 124 is possible. In the fourth mode, air heat recovery using the radiators in addition to the PE heat recovery is impossible. Furthermore, the controller 10 opens the AAF 11 in the third mode in which the air heat recovery is performed, and closes the AAF 11 in the fourth mode in which the air heat recovery is impossible.

Figure 6:
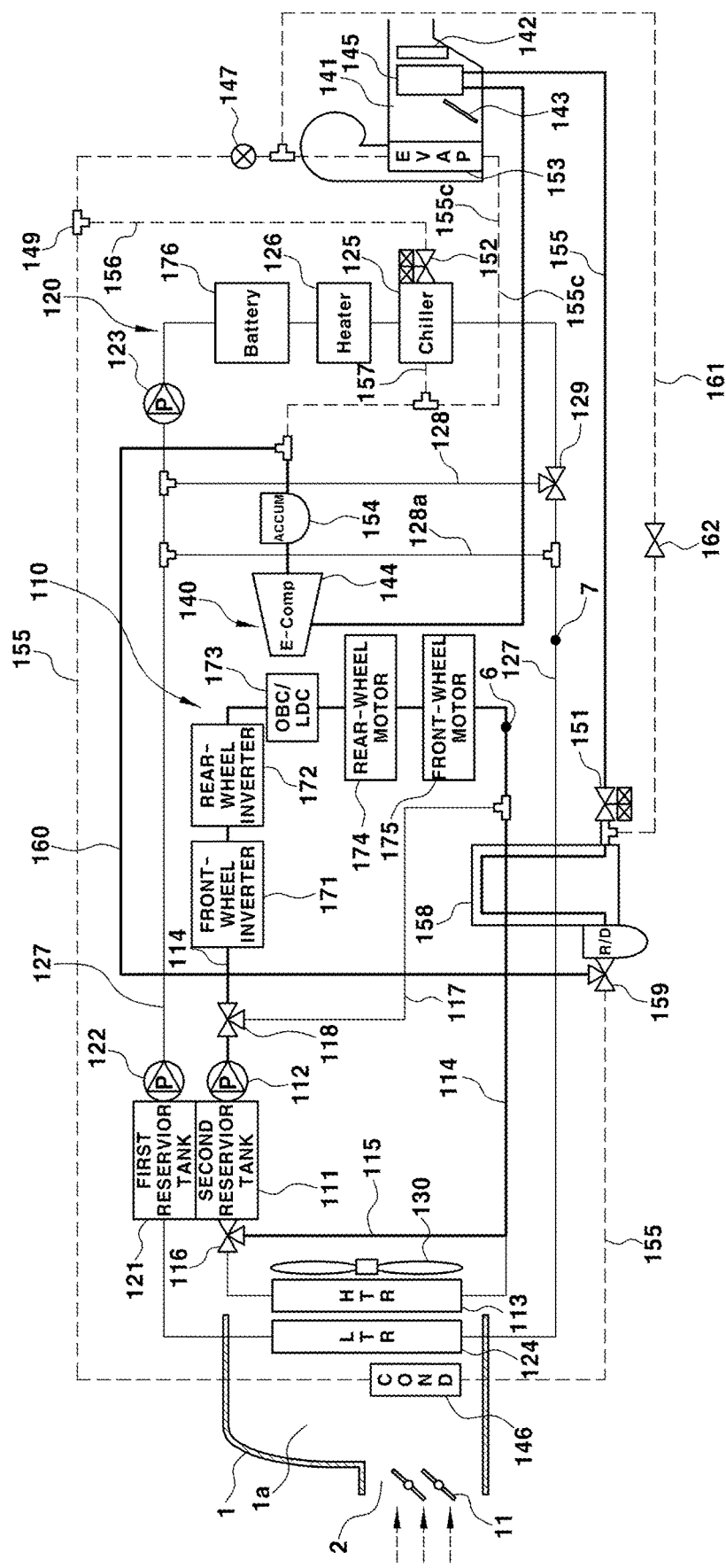

FIG. 6 is a diagram illustrating flow states of a coolant and a refrigerant in the third mode. Even in the third mode, the controller 10 drives the compressor 144, opens the second expansion valve 151, and controls an opening state of the refrigerant control valve 159 so that the portion of the refrigerant line 155 coupled to the external condenser 146 is blocked and the portion of the coupling line 160 is opened. Accordingly, the refrigerant is circulated along the path of the compressor 144, the internal condenser 145, the second expansion valve 151, the heat exchanger 158, the refrigerant control valve 159, the accumulator 154, and then the compressor 144 in all the refrigerant lines 155.

Furthermore, in the third mode, the controller 10 drives the first electric water pump 112 and the second electric water pump 122 so that the coolant is circulated, but opens the portion of the flow increase bypass line 117 and controls an opening state of the coolant control valve 118 so that the first coolant line 114 on the portion of the first electric water pump 112 and the first coolant line 114 on the portion of the PE parts 171 to 175 communicate with each other.

Furthermore, in the third mode, the controller 10 blocks the portion of the first bypass line 115 so that the coolant can also pass through the first radiator 113, and controls an opening state of the first bypass valve 116 so that the first coolant line 114 on the exit side of the first radiator 113 and the first reservoir tank 121 communicate with each other.

Accordingly, as the coolant of the first cooling circuit 110 flows along the flow increase bypass line 117, the coolant bypasses (or skips) the PE parts 171 to 175. As a result, the coolant is circulated along the path of the first electric water pump 112, the coolant control valve 118, the flow increase bypass line 117, the heat exchanger 158, the first radiator 113, the first bypass valve 116, the second reservoir tank 111, and then the first electric water pump 112.

As described above, in the third mode, there are effects in that as the coolant does not pass through the PE parts 171 to 175, a flow rate of a coolant lost in the path of the first coolant line passing through the first radiator 113 may be minimized and a flow rate of a coolant in the path of the first coolant line for air heat recovery is increased compared to a case where the coolant passes through the PE parts 171 to 175.

Furthermore, in the third mode, the controller 10 controls an opening state of the second bypass valve 129 so that the portion of the second bypass line 128 is opened. Accordingly, the second coolant line 127 and the second bypass line 128 that connect the third electric water pump 123, the battery 176, the battery heater 126, the battery chiller 125, and the second bypass valve 129 are separated from the remaining second coolant line 127 passing through the second radiator 124.

Accordingly, in the third mode, the coolant of the second cooling circuit 120, that is, the coolant of the second coolant line 127, is circulated along the path of the second electric water pump 122, the third bypass line 128a, the heat exchanger 158, the second radiator 124, the first reservoir tank 121, and then the second electric water pump 122. Such a path of the coolant of the second coolant line 127 is not different from that in the first mode.

Accordingly, in the third mode, PE heat recovery is impossible because the coolant does not pass through the PE parts 171 to 175, but air heat recovery using the first radiator 113 is performed because the coolant passes through the first radiator 113.

That is, in the state in which the AAF 11 has been opened, heat of outside air (or air) may be absorbed while the coolant passes through the first radiator 113, that is, an HTR. Thereafter, after moving along the first coolant line 114, the coolant may deliver, to the refrigerant, the heat absorbed from the outside air in the heat exchanger 158. Thereafter, the heat delivered to the refrigerant may be used for heating in the internal condenser 145, facilitating an air heat recovery operation for heating using the recovered heat of the outside air in the first radiator 113.

Likewise, heat of outside air (or air) may be absorbed while the coolant passes through the second radiator 124, that is, an LTR. Thereafter, after moving along the second coolant line 127, the coolant may deliver, to the refrigerant, the heat absorbed from the outside air in the heat exchanger 158. Thereafter, the heat delivered to the refrigerant may be used for heating in the internal condenser 145, facilitating an air heat recovery operation for heating using the recovered heat of the outside air in the second radiator 124.

Figure 7:
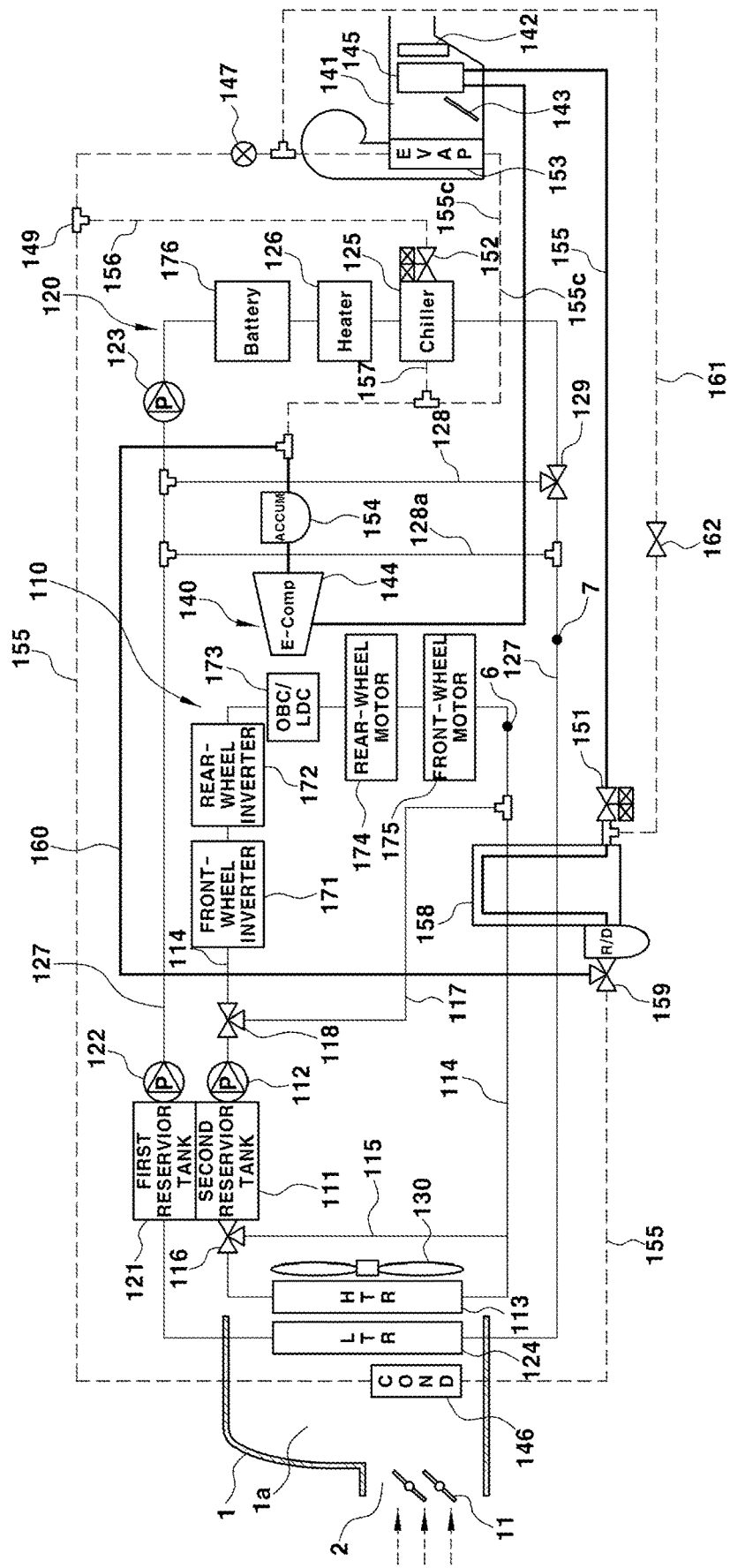
Figure 8:
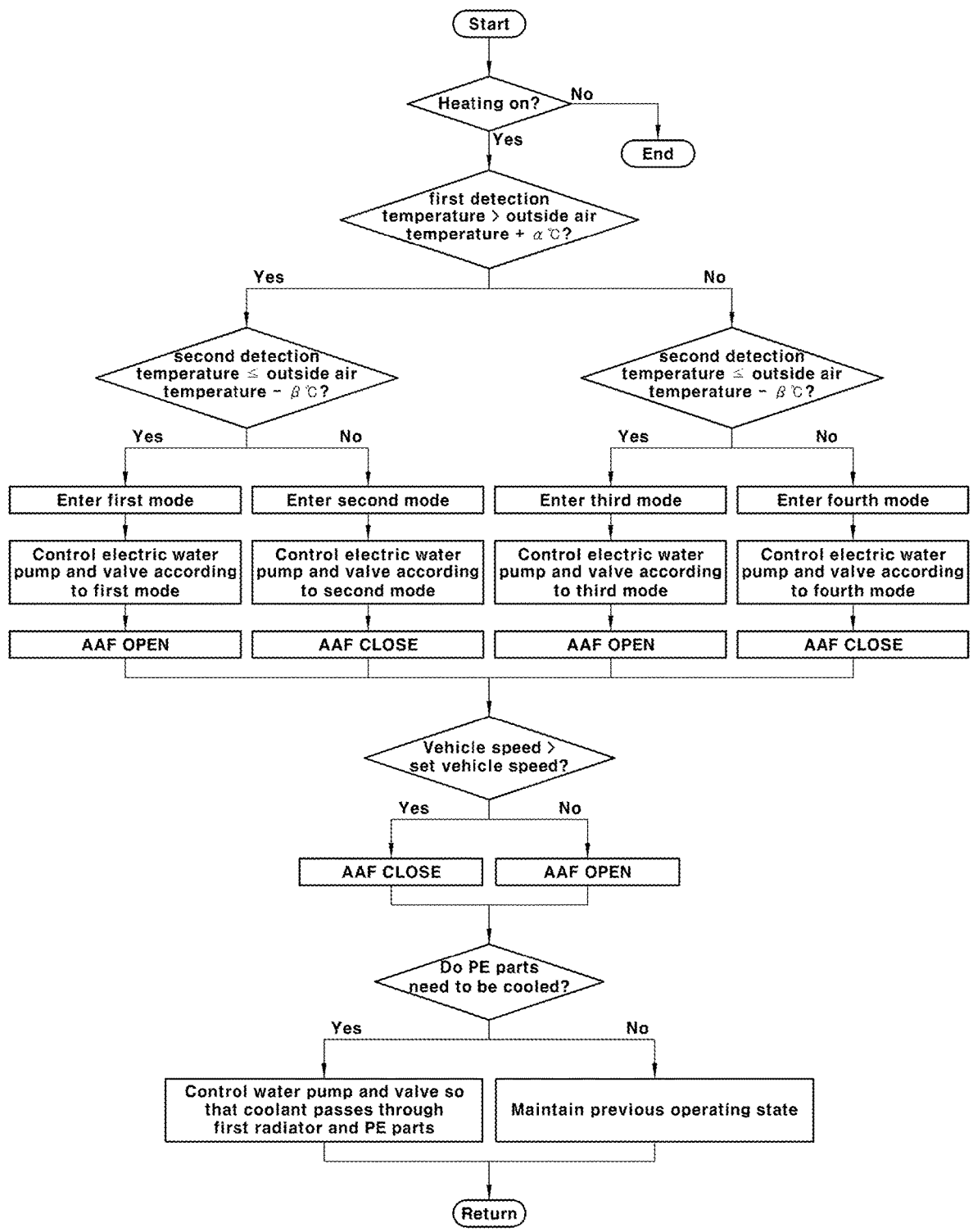
FIG. 8 is a flowchart illustrating a process of controlling the thermal management system according to various exemplary embodiments of the present invention.

FIG. 7 is a diagram illustrating flow states of a coolant and a refrigerant in the fourth mode. In the fourth mode, both the first electric water pump 112 and the second electric water pump 122 maintain a stop state, and the AAF 11 is controlled in a closed state.

In the instant case, air heat recovery is impossible because the coolant does not flow into the first radiator 113 and the PE parts 171 to 175, the first coolant line 114 coupled to the heat exchanger 158, and the second coolant line 127 coupled to the second radiator 124 and the heat exchanger 158. Furthermore, PE heat recovery is also impossible because the coolant does not pass through the PE parts 171 to 175.

In the instant case, the controller 10 drives the compressor 144, opens the second expansion valve 151, and controls an opening state of the refrigerant control valve 159 so that the portion of the refrigerant line 155 coupled to the external condenser 146 is blocked and the portion of the coupling line 160 is opened. Accordingly, the refrigerant is circulated along the path of the compressor 144, the internal condenser 145, the second expansion valve 151, the heat exchanger 158, the refrigerant control valve 159, the accumulator 154, and then the compressor 144 in all the refrigerant lines 155.

Accordingly, in the fourth mode, heating by which a refrigerant compressed at a high temperature and high pressure by the compressor 144 heats air discharged from the internal condenser 145 to the interior of the vehicle may be performed without PE heat recovery and air heat recovery.

In the first mode to the fourth mode, the heat pump system, that is, an assistant heating apparatus, and the electric heater 142, that is, a main heating apparatus, may be simultaneously driven. Power consumed by the electric heater 142 may be reduced by driving both the electric heater 142 and the heater pump system. The AER per charge when the electric vehicle is charged once may be increased.

In the third mode upon low-temperature (i.e., a condition in which an outside air temperature is low) driving, air heat recovery using both the first radiator 113 and the second radiator 124 is performed. In the instant case, a coolant passing through the first radiator 113 is controlled in a way to not pass through the PE parts 171 to 175. Accordingly, a flow rate of the coolant passing through the first radiator 113 may be secured to have a flow rate level upon room temperature driving.

Figure 9:
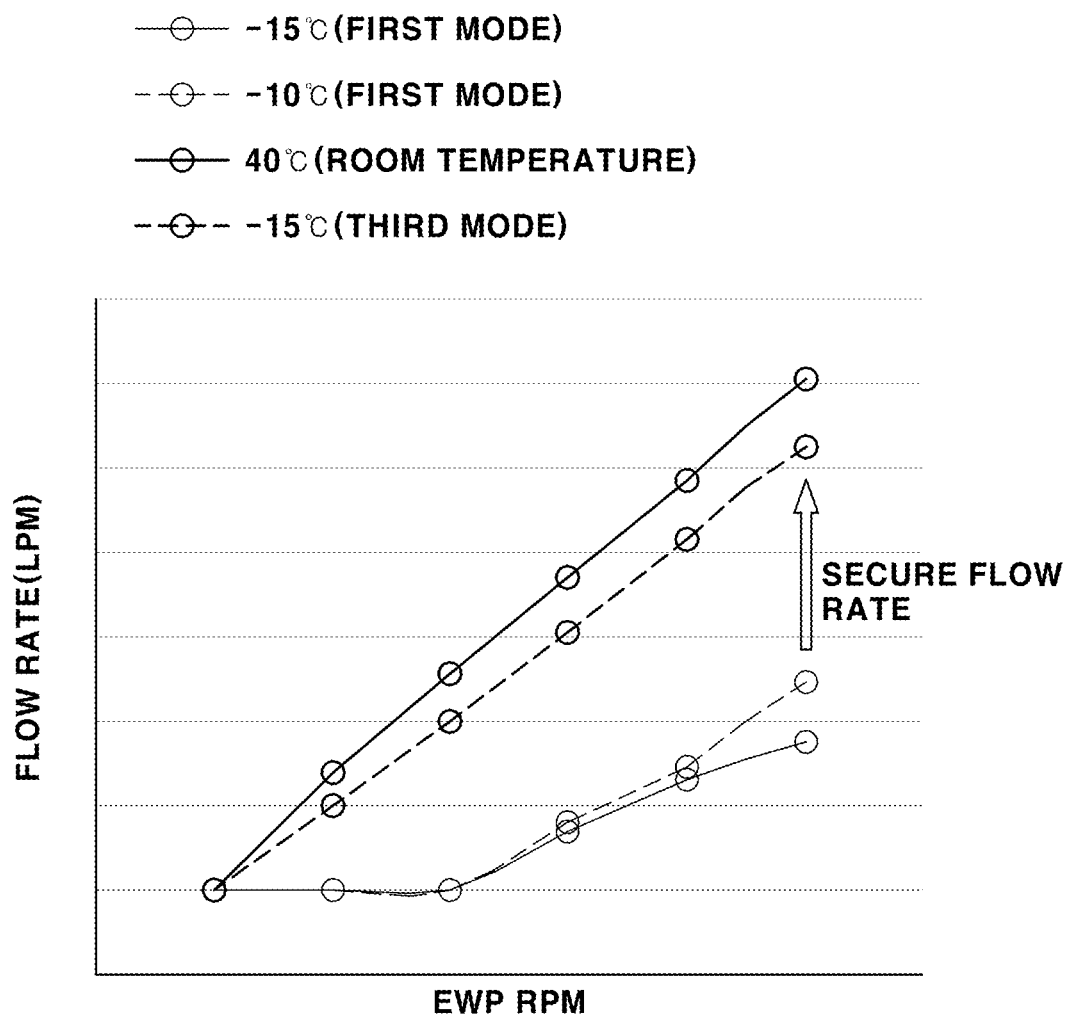
FIG. 9 is a diagram illustrating a comparison between the flow rates of coolants in a first mode and a third mode according to various exemplary embodiments of the present invention.

This is more specifically described below. To describe effects of the thermal management system according to various exemplary embodiments of the present invention, the first mode and the third mode are compared. FIG. 9 is a diagram illustrating a comparison between the flow rates of coolants in the first mode and the third mode.

The first mode and the third mode are the same in the circulation path of a coolant passing through the second radiator 124 and the heat exchanger 158 and the circulation path of a refrigerant passing through the internal condenser 145 and the heat exchanger 158. Furthermore, the first mode and the third mode are the same in that an air heat recovery operation using the second radiator 124 is performed and assistant heating using the internal condenser 145 is performed.

In the instant case, the third mode is selected in a condition in which PE heat recovery is impossible compared to the first mode. The third mode is a mode in which air heat recovery using the first radiator is performed while increasing a flow rate of a coolant by use of the flow increase bypass line 117 and the coolant control valve 118, that is, major feature units added in the thermal management system according to various exemplary embodiments of the present invention.

In the third mode, PE heat recovery is not performed because the coolant does not pass through the PE parts 171 to 175, but the coolant is circulated only along a short path between the first radiator 113 and the heat exchanger 158, which does not pass through the PE parts 171 to 175. Accordingly, discharge resistance may be reduced, and a flow rate of the coolant passing through the first radiator 113 and the heat exchanger 158 can also be increased.

In the first mode, relatively high discharge resistance occurs while the coolant is circulated because the coolant passes through all the remaining portions of the first cooling circuit 110, including the motors 174 and 175, the inverters 171 and 172, and the OBC/LDC 173, except the first radiator 113. In a sub-zero condition, a flow rate of the coolant that circulates along the first cooling circuit 110 is greatly reduced as in FIG. 9.

In contrast, in the third mode, discharge resistance is greatly reduced compared to the first mode while the coolant is circulated because the coolant does not pass through all of the front-wheel motor 175, the rear-wheel motor 174, the front-wheel inverter 171, the rear-wheel inverter 172, and the OBC/LDC 173. In the instant case, as illustrated in FIG. 8, a flow rate of the coolant may be secured to a room temperature level.

In the first mode, the coolant needs to pass through all the PE parts 171 to 175. Accordingly, after the coolant moves from the front-wheel motor 175 at the front of the vehicle to the rear-wheel motor 174 in the rear of the vehicle, the coolant needs to move to the heat exchanger 158 at the front of the vehicle again. In the instant case, a round trip distance of the coolant in the vehicle is several meters (m).

Accordingly, heat of the coolant may be easily lost to the outside while the coolant moves the long distance up to the front-wheel motor 175, the rear-wheel motor 174, and then the heat exchanger 158 at the front of the vehicle. Nevertheless, the first mode may be selected if it is advantageous to use, for heating, heat recovered from the PE parts 171 to 175.

In contrast, as in the third mode, when a temperature of the PE parts 171 to 175 is in a low temperature condition, PE heat recovery by which heat of the PE parts is used for heating is almost impossible, when considering that heat of the coolant is lost to the outside while the coolant moves the long distance up to the front-wheel motor 175, the rear-wheel motor 174, and then the heat exchanger 158 at the front of the vehicle.

Accordingly, if it is insufficient to use heat of the PE parts 171 to 175 for heating because a temperature of the coolant passing through the PE parts 171 to 175, that is, a temperature (first detection temperature) of the coolant detected by the first temperature sensor 6 is low (when PE heat recovery is impossible), the third mode is performed so that a flow rate of the coolant that circulates along the first radiator 113 and the heat exchanger 158 may be increased as much as possible.

That is, when it is insufficient to use heat of the PE parts 171 to 175 for heating in the low temperature condition, performance of the heat pump system may be maximized by increasing a flow rate of the coolant and to recover air heat as much as possible in the third mode. Accordingly, performance of the heat pump system may be maximized, and a room temperature versus low-temperature driving range ratio may be increased because power consumption in the electric heater 142 is reduced.

As illustrated in FIG. 8, the controller 10 closes the AAF 11 in a high-speed driving state in which a vehicle speed detected by the vehicle speed sensor 4 while the vehicle travels is higher than a set vehicle speed (e.g., 80 km/hr), and maintains a previous state of the AAF 11 (a precedent command for the AAF is maintained) when the vehicle speed is the set vehicle speed or less, that is, a low-speed driving state.

Next, the controller 10 determines whether it is necessary to cool the PE parts according to common logic. If the PE parts 171 to 175 need to be cooled, the controller 10 controls the AAF 11 in the open state. At the instant time, the controller 10 starts control over an integrated mode to maximize performance of the heat pump system.

Figure 10:
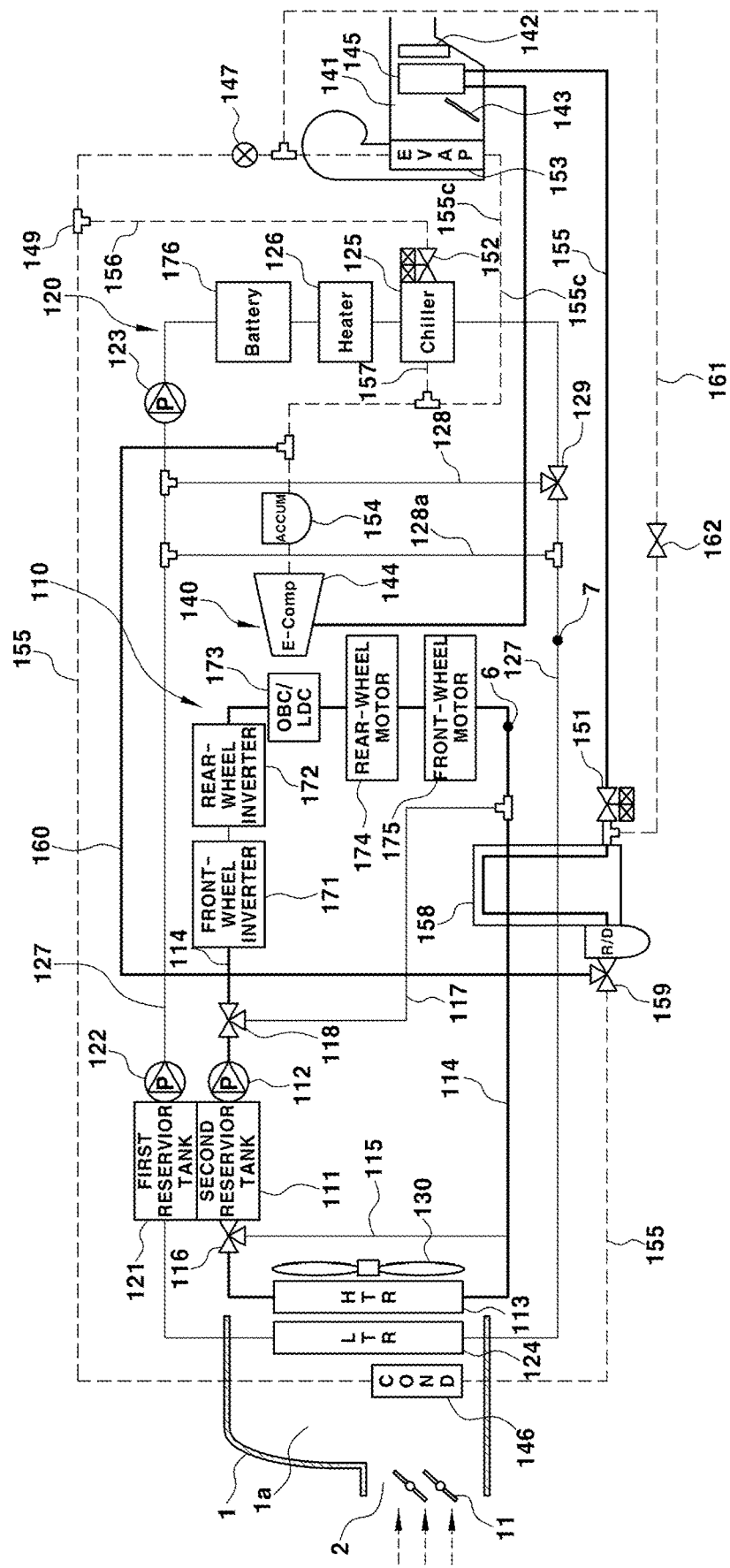
FIG. 10 is a diagram illustrating flow states of a coolant and a refrigerant in an integrated mode in the thermal management system according to various exemplary embodiments of the present invention.

FIG. 10 illustrates a state in the integrated mode. As illustrated, in the integrated mode, the controller 10 controls opening states of the first bypass valve 116 and the coolant control valve 118 so that the PE parts (PE) may be cooled using the first radiator 113, that is, an HTR. That is, the controller 10 controls the opening states of the first bypass valve 116 and the coolant control valve 118 so that the coolant of the first coolant line 114 may pass through the first radiator 113, the PE parts 171 to 175, and the heat exchanger 158.

At the present time, the first bypass valve 116 is controlled so that the second coolant line on the exit side of the first radiator 113 and the flow passage on the portion of the second reservoir tank 111 communicate with each other and the portion of the first bypass line 115 is blocked. Furthermore, the coolant control valve 118 is controlled so that the second coolant line on the exit side of the second electric water pump 122 and the second coolant line on the portion of the PE parts 171 to 175 communicate with each other and the portion of the flow increase bypass line 117 is blocked.

Accordingly, in the first coolant line 114 of the first cooling circuit 110, the coolant is circulated along the path of the second reservoir tank 111, the first electric water pump 112, the coolant control valve 118, the PE parts 171 to 175, the heat exchanger 158, the first radiator 113, the first bypass valve 116, and then the second reservoir tank 111. In the instant case, a control state of the second cooling circuit 120, including the second coolant line 127, and the circulation path of the coolant may be maintained as a previous state, that is, the states of the first to the fourth mode.

Furthermore, in a condition in which the PE parts do not need to be cooled, a previous heating mode remains without any change (a precedent command is maintained). Thereafter, when a user stops a heating operation (the heat pump system is operated) by manipulating the manipulation unit 5, the control logic of FIG. 8 is terminated.

Accordingly, according to the thermal management system for a vehicle according to various exemplary embodiments of the present invention, a problem with performance degradation of a heat pump system caused by a reduction in a flow rate of a coolant upon low-temperature driving may be solved. Active and efficient performance of the heat pump system may be achieved depending on an outside air temperature.

Furthermore, as the indoor space of an electric vehicle is recently increased, power consumption may be increased and a room temperature versus low-temperature driving range ratio may be decreased upon heating load and heating. However, a high low-temperature driving range ratio may be maintained and achieved even in an electric vehicle having a large indoor space because performance of the heat pump system is maximized when the present invention is applied.

As a result, the present invention can provide the AER per having the same level as that in room temperature driving even in low-temperature driving, can greatly contribute to the improvements of a commercial value of a vehicle, and can provide a financial profit to a vehicle buyer because the vehicle buyer may be provided with a maximum national subsidy when purchasing the electric vehicle due to an increased low-temperature driving range ratio.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A thermal management system for a vehicle, the thermal management system comprising:
 a first cooling circuit configured to cool power electronic (PE) parts mounted in the first cooling circuit and including:
  a first radiator;
  a first coolant line connecting the power electronic (PE) parts and the first radiator, wherein a coolant is circulated through the first coolant line between the first radiator and the PE parts; and a first electric water pump configured to circulate the coolant along the first coolant line;
a heat pump system including:
  a compressor configured to compress a refrigerant;
  an internal condenser configured to perform a heat exchange between the refrigerant compressed by the compressor and air supplied to an interior of the vehicle;
  a refrigerant line connecting the compressor and the internal condenser and configured to circulate the refrigerant between the compressor and the internal condenser; and
  a heat exchanger configured to perform the heat exchange between the coolant and the refrigerant;
a flow increase bypass line fluidically connecting an upstream point and a downstream point of the PE parts on the first coolant line;
a coolant control valve provided at a location where the flow increase bypass line is branched off in the first coolant line and configured to control a flow direction of the coolant so that the coolant selectively passes or bypasses the PE parts;
a second cooling circuit including a second coolant line configured to circulate a coolant between the heat exchanger and a second radiator and a second electric water pump configured to circulate the coolant along the second coolant line,
wherein the first cooling circuit further includes a first temperature sensor configured to detect a temperature of the coolant having passed through the PE parts in the first coolant line, and
wherein the controller electrically connected to the first temperature sensor is configured to control the circulation of the coolant in the first cooling circuit according to the temperature of the coolant detected by the first temperature sensor and an outside air temperature detected by an outside air temperature sensor electrically connected to the controller, and
wherein when the controller concludes that the temperature of the coolant detected by the first temperature sensor is higher than a sum of the outside air temperature and a first setting temperature, the controller electrically connected to a first bypass valve is configured to drive the first electric water pump, and to open the first bypass line by controlling the first bypass valve, so that a heat exchange between the coolant that has cooled the PE parts and the refrigerant that has passed through the internal condenser is performed while the coolant passes through the heat exchanger, and the coolant having passed through the heat exchanger is circulated by bypassing the first radiator.

2. The thermal management system of claim 1, wherein the PE parts include at least one of a front-wheel motor configured to drive front wheels of the vehicle, a rear-wheel motor configured to drive rear wheels of the vehicle, a front-wheel inverter coupled to the front-wheel motor, a rear-wheel inverter coupled to the rear-wheel motor, an on-board charger/low voltage DC-DC converter (OBC/LDC) configured to charge a battery, and the controller.

3. The thermal management system of claim 1, wherein the first cooling circuit further includes:
a first bypass line fluidically connecting an upstream point and a downstream point of the first radiator on the first coolant line; and
a first bypass valve provided at a location where the first bypass line is branched in the first coolant line and configured to control a flow direction of the coolant so that the coolant selectively bypasses the first radiator.

4. The thermal management system of claim 3, wherein the heat exchanger is provided to allow the coolant of the second coolant line to pass through the heat exchanger so that a heat exchange between a coolant that has absorbed heat of outside air in the second radiator and a refrigerant that has passed through the internal condenser is performed.

5. The thermal management system of claim 4, wherein the second cooling circuit further includes a second temperature sensor configured to detect a temperature of the coolant on an entrance side of the heat exchanger in the second coolant line, and
wherein the controller electrically connected to the second temperature sensor is configured to control the circulation of the coolant in the second cooling circuit according to the temperature of the coolant detected by the second temperature sensor and the outside air temperature detected by the outside air temperature sensor.

6. The thermal management system of claim 5, wherein when the controller concludes that the temperature of the coolant detected by the second temperature sensor is a value of the outside air temperature subtracted by a second setting temperature or less than the value, the controller is configured to drive the second electric water pump, so that the coolant is circulated in the second cooling circuit and a heat exchange between the coolant that has absorbed the heat of the outside air in the second radiator and the refrigerant is performed.

7. The thermal management system of claim 6, wherein when the controller concludes that the temperature of the coolant detected by the first temperature sensor is higher than a sum of the outside air temperature and a first setting temperature and the temperature of the coolant detected by the second temperature sensor is the value of the outside air temperature subtracted by the second setting temperature or less than the value, the controller is configured to drive the first electric water pump, and to open the first bypass line by controlling the first bypass valve, so that a heat exchange between the coolant that has cooled the PE parts and the refrigerant that has passed through the internal condenser is performed while the coolant passes through the heat exchanger, and the coolant having passed through the heat exchanger is circulated by bypassing the first radiator.

8. The thermal management system of claim 6, wherein when the controller concludes that the temperature of the coolant detected by the first temperature sensor is a sum of the outside air temperature and a first setting temperature or less than the sum and the temperature of the coolant detected by the second temperature sensor is the value of the outside air temperature subtracted by the second setting temperature or less than the value, the controller is configured to drive the first electric water pump, to control the first bypass valve so that the coolant of the first coolant line passes through the first radiator, and to open the flow increase bypass line by controlling the coolant control valve so that a heat exchange between the coolant that has bypassed the PE parts after absorbing the heat of the outside air in the first radiator and the refrigerant that has passed through the internal condenser is performed while the coolant having passed through the heat exchanger.

9. The thermal management system of claim 5,
wherein when the controller concludes that the temperature of the coolant detected by the second temperature sensor is higher than a value of the outside air temperature subtracted by a second setting temperature, the controller is configured to stop the second electric water pump so that the coolant is not circulated in the second cooling circuit.

10. The thermal management system of claim 9, further including:
wherein the controller is configured to close an active air flap (AAF) so that the outside air is not introduced through the outside air inlet.

11. The thermal management system of claim 9,
wherein when the controller concludes that the temperature of the coolant detected by the first temperature sensor is higher than a sum of the outside air temperature and a first setting temperature and the temperature of the coolant detected by the second temperature sensor is higher than the value of the outside air temperature subtracted by the second setting temperature, the controller is configured to drive the first electric water pump, and to open the first bypass line by controlling the first bypass valve, so that a heat exchange between the coolant that has cooled the PE parts and the refrigerant that has passed through the internal condenser is performed while the coolant passes through the heat exchanger, and the coolant having passed through the heat exchanger is circulated by bypassing the first radiator.

12. The thermal management system of claim 9,
wherein when the controller concludes that the temperature of the coolant detected by the first temperature sensor is a sum of the outside air temperature and a first setting temperature or less than the sum and the temperature of the coolant detected by the second temperature sensor is higher than the value of the outside air temperature subtracted by the second setting temperature, the controller is configured to stop the first electric water pump and the second electric water pump so that the coolant is not circulated in the first cooling circuit and the second cooling circuit.

13. The thermal management system of claim 1, further including:
wherein the heat exchanger is provided to allow the coolant of the second coolant line to pass through the heat exchanger, so that a heat exchange between a coolant that has absorbed heat of outside air in the second radiator and a refrigerant that has passed through the internal condenser is performed.

14. The thermal management system of claim 13,
wherein the second cooling circuit further includes a second temperature sensor configured to detect a temperature of the coolant on an entrance side of the heat exchanger in the second coolant line, and
wherein the controller electrically connected to the second temperature sensor is configured to control the circulation of the coolant in the second cooling circuit according to the temperature of the coolant detected by the second temperature sensor and an outside air temperature detected by an outside air temperature sensor electrically connected to the controller.

15. The thermal management system of claim 14,
wherein when the controller concludes that the temperature of the coolant detected by the second temperature sensor is a value of the outside air temperature subtracted by a second setting temperature or less than the value, the controller is configured to drive the second electric water pump, so that the coolant is circulated in the second cooling circuit and a heat exchange between the coolant that has absorbed the heat of the outside air in the second radiator and the refrigerant is performed.

16. The thermal management system of claim 14,
wherein when the controller concludes that the temperature of the coolant detected by the second temperature sensor is higher than a value of the outside air temperature subtracted by a second setting temperature, the controller is configured to stop the second electric water pump so that the coolant is not circulated in the second cooling circuit.

17. The thermal management system of claim 3,
wherein in a condition in which the PE parts need to be cooled, the controller is configured to open an active air flap (AAF), to drive the first electric water pump, to control the coolant control valve so that the coolant passes through the PE parts to cool the PE parts, and to control the first bypass valve so that the coolant that has cooled the PE parts passes through the first radiator.

* * * * *